United States Patent
El-Dinary

(10) Patent No.: US 9,986,401 B2
(45) Date of Patent: May 29, 2018

(54) SYSTEMS AND METHODS FOR EMERGENCY VEHICLE PROXIMITY WARNINGS USING DIGITAL RADIO BROADCAST

(71) Applicant: iBiquity Digital Corporation, Columbia, MD (US)

(72) Inventor: Ashruf S. El-Dinary, Clarksville, MD (US)

(73) Assignee: Ibiquity Digital Corporation, Columbia, MD (US)

( * ) Notice: Subject to any disclaimer, the term of this patent is extended or adjusted under 35 U.S.C. 154(b) by 11 days.

(21) Appl. No.: 14/957,797

(22) Filed: Dec. 3, 2015

(65) Prior Publication Data
US 2016/0165424 A1    Jun. 9, 2016

Related U.S. Application Data

(60) Provisional application No. 62/087,581, filed on Dec. 4, 2014.

(51) Int. Cl.
H04M 11/04    (2006.01)
H04W 4/22    (2009.01)
(Continued)

(52) U.S. Cl.
CPC ............ H04W 4/22 (2013.01); H04B 1/3822 (2013.01); H04H 20/59 (2013.01); H04H 20/62 (2013.01); H04W 4/06 (2013.01); H04W 72/0453 (2013.01)

(58) Field of Classification Search
CPC ..... H04W 4/22; H04W 4/06; H04W 72/0453; H04W 4/02; H04W 64/00; H04W 76/007;
(Continued)

(56) References Cited

U.S. PATENT DOCUMENTS 4,942,395 A    7/1990    Ferrari et al.
5,881,365 A *    3/1999    Yang .................... G08B 3/1016
                                                         455/103
(Continued)

FOREIGN PATENT DOCUMENTS

WO        2010065914 A2    6/2010
WO    WO-2016090132 A1    6/2016

OTHER PUBLICATIONS

Patent Cooperation Treaty, International Search Report and Written Opinion of the International Searching Authority, PCT/US2008/012752, dated Jan. 28, 2009.
(Continued)

*Primary Examiner* — Kathy Wang-Hurst
*Assistant Examiner* — B. M. M Hannan
(74) *Attorney, Agent, or Firm* — Schwegman Lundberg & Woessner, P.A.

(57) ABSTRACT

Systems and methods are disclosed for communicating an emergency alert message from a digital radio broadcast transmission system of a mobile vehicle to a digital radio broadcast receiver system. A digital radio broadcast signal including first and second data is broadcasted using the digital radio broadcast transmission system to end-user digital radio broadcast receivers. The first data includes an emergency code, and the second data includes an emergency alert message. The digital radio broadcast signal is transmitted at a predetermined frequency that is recognized by the receivers as an emergency notification frequency. The digital radio broadcast signal can be decoded only by receivers located within a localized area in a proximity of the transmission system. The receivers are configured to automatically tune to the emergency notification frequency to receive the digital radio broadcast signal and render the (Continued)

second data based on a detection of the emergency code within the signal.

18 Claims, 18 Drawing Sheets

(51) Int. Cl.
*H04B 1/3822* (2015.01)
*H04W 4/06* (2009.01)
*H04W 72/04* (2009.01)
*H04H 20/59* (2008.01)
*H04H 20/62* (2008.01)

(58) Field of Classification Search
CPC ...... H04B 1/3822; H04H 20/59; H04H 20/62; G08B 25/016
USPC ...................................................... 455/404.2
See application file for complete search history.

(56) References Cited

U.S. PATENT DOCUMENTS

| | | |
|---|---|---|
| 6,177,873 B1 | 1/2001 | Cragun |
| 6,397,076 B1 | 5/2002 | Brown et al. |
| 6,553,215 B1 | 4/2003 | Chung |
| 6,778,101 B2 | 8/2004 | Turbeville et al. |
| 6,861,959 B1 | 3/2005 | Torres Sabate et al. |
| 6,958,707 B1 | 10/2005 | Siegel |
| 8,138,915 B2 | 3/2012 | Milbar |
| 2001/0038344 A1* | 11/2001 | Garcia ................. G08G 1/0965 340/902 |
| 2003/0036357 A1 | 2/2003 | McGowan |
| 2003/0084108 A1 | 5/2003 | Syed |
| 2005/0136884 A1 | 6/2005 | Reidelsturz et al. |
| 2005/0174233 A1 | 8/2005 | Kennedy et al. |
| 2006/0135115 A1 | 6/2006 | Bell |
| 2006/0161946 A1 | 7/2006 | Shin |
| 2006/0184962 A1 | 8/2006 | Kendall et al. |
| 2006/0209941 A1 | 9/2006 | Kroeger |
| 2006/0223492 A1 | 10/2006 | Chin et al. |
| 2006/0267783 A1 | 11/2006 | Smith |
| 2006/0270370 A1 | 11/2006 | Bergman |
| 2006/0271952 A1 | 11/2006 | Gurley et al. |
| 2006/0273893 A1 | 12/2006 | Warner |
| 2006/0273895 A1 | 12/2006 | Kollin |
| 2006/0292980 A1 | 12/2006 | Marcos Alba |
| 2007/0008104 A1 | 1/2007 | McBain |
| 2007/0021099 A1 | 1/2007 | Sato |
| 2007/0030156 A1 | 2/2007 | Schlager et al. |
| 2007/0047520 A1 | 3/2007 | Byers et al. |
| 2007/0052533 A1 | 3/2007 | Glazer |
| 2007/0132609 A1* | 6/2007 | Stackelhouse ....... G08G 1/0965 340/904 |
| 2007/0200741 A1 | 8/2007 | Hunter |
| 2007/0252688 A1 | 11/2007 | Eisold et al. |
| 2008/0272934 A1* | 11/2008 | Wang ........................ H02J 3/14 340/870.11 |
| 2009/0128323 A1* | 5/2009 | Milbar ................. G08B 27/008 340/539.1 |
| 2009/0239557 A1* | 9/2009 | Kadakia ................. H04H 20/34 455/466 |
| 2009/0264149 A1 | 10/2009 | Miller et al. |
| 2010/0045483 A1* | 2/2010 | Kirkpatrick .......... G08G 1/0965 340/903 |
| 2010/0137006 A1* | 6/2010 | Rofougaran ........ H04M 1/6075 455/457 |
| 2010/0159836 A1* | 6/2010 | Lau ........................ H04H 20/22 455/42 |
| 2011/0181408 A1* | 7/2011 | Greenis ................... G08B 27/00 340/539.1 |
| 2012/0035908 A1 | 2/2012 | Lebeau et al. |
| 2015/0046943 A1* | 2/2015 | Shintani ............... H04N 21/814 725/33 |
| 2015/0256276 A1* | 9/2015 | Jones ..................... H04H 20/59 455/3.01 |

OTHER PUBLICATIONS

OASIS Emergency Management Technical Committee, "OASIS Common Alerting Protocol, v. 1.1," OASIS Standard CAP-V1.1, Oct. 1, 2005, pp. 1-35. http://www.oasis-open.org/apps/org/workgroup/emergency/download.php/14205/emergency-CAPv1.1-Committee%20Specification.doc.

National Radio Systems Committee, "NRSC-5-A: In-Band On-Channel Digital Radio Broadcasting Standard," Sep. 2005, pp. 1-36, http://www.nrscstandards.org/SG/NRSC-5-A/NRSC-5.A.pdf.

Patent Cooperation Treaty, International Search Report and Written Opinion of the International Searching Authority, PCT/US2015/063719, dated Feb. 5, 2016.

"International Application Serial No. PCT/US2015/063719, International Preliminary Report on Patentability dated Jun. 15, 2017", 12 pgs.

* cited by examiner

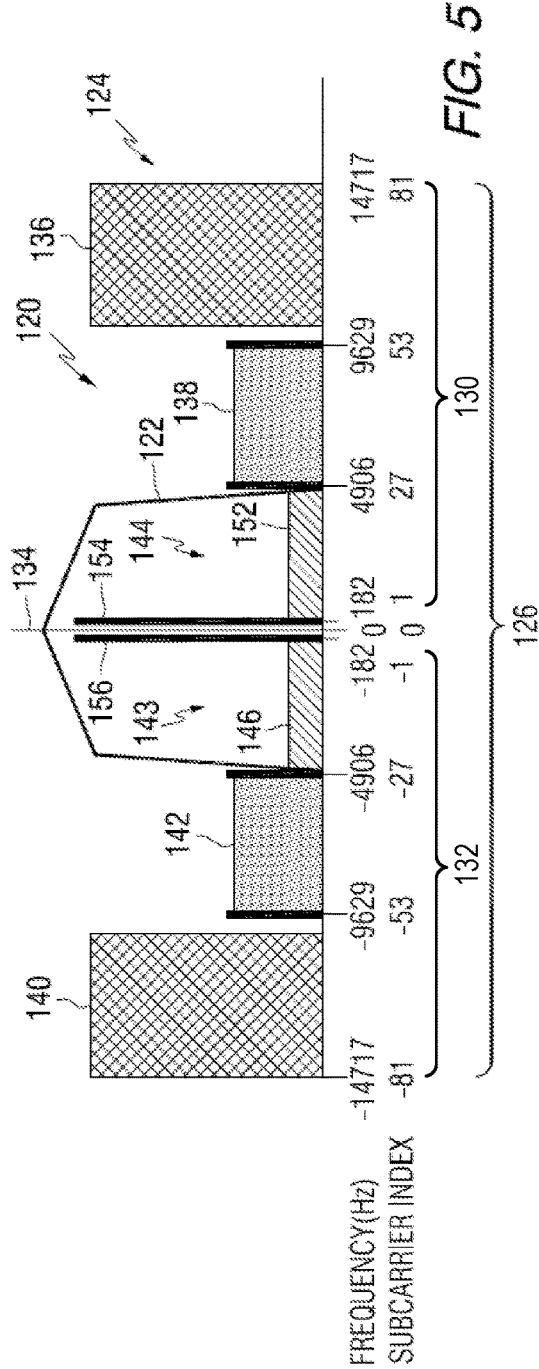

SYSTEMS AND METHODS FOR EMERGENCY VEHICLE PROXIMITY WARNINGS USING DIGITAL RADIO BROADCAST

CROSS-REFERENCE TO RELATED APPLICATIONS

This application claims priority to U.S. Provisional Patent Application No. 62/087,581, filed Dec. 4, 2014, entitled "Systems and Methods for Emergency Vehicle Proximity Warnings Using Digital Radio Broadcast," which is incorporated herein by reference in its entirety.

FIELD OF THE DISCLOSURE

This disclosure relates to digital radio broadcasting and more particularly to systems and methods for transmitting alert information via digital radio broadcast signals and rendering alert information at a digital radio broadcast receiver.

BACKGROUND INFORMATION

Digital radio broadcasting technology delivers digital audio and data services to mobile, portable, and fixed receivers. One type of digital radio broadcasting, referred to as in-band on-channel (IBOC) digital audio broadcasting (DAB), uses terrestrial transmitters in the existing Medium Frequency (MF) and Very High Frequency (VHF) radio bands. HD Radio™ technology, developed by iBiquity Digital Corporation, is one example of an IBOC implementation for digital radio broadcasting and reception.

IBOC DAB signals can be transmitted in a hybrid format including an analog modulated carrier in combination with a plurality of digitally modulated carriers or in an all-digital format wherein the analog modulated carrier is not used. Using the hybrid mode, broadcasters may continue to transmit analog AM and FM simultaneously with higher-quality and more robust digital signals, allowing themselves and their listeners to convert from analog-to-digital radio while maintaining their current frequency allocations.

One feature of digital transmission systems is the inherent ability to simultaneously transmit both digitized audio and data. Thus the technology also allows for wireless data services from AM and FM radio stations. The broadcast signals can include metadata, such as the artist, song title, or station call letters.

IBOC DAB technology can provide digital quality audio, superior to existing analog broadcasting formats. Because each IBOC DAB signal is transmitted within the spectral mask of an existing AM or FM channel allocation, it requires no new spectral allocations. IBOC DAB promotes economy of spectrum while enabling broadcasters to supply digital quality audio to the present base of listeners.

Multicasting, the ability to deliver several programs or data streams over one channel in the AM or FM spectrum, enables stations to broadcast multiple streams of data on separate supplemental or sub-channels of the main frequency. For example, multiple streams of data can include alternative music formats, local traffic, weather, news, and sports. The supplemental channels can be accessed in the same manner as the traditional station frequency using tuning or seeking functions. For example, if the analog modulated signal is centered at 94.1 MHz, the same broadcast in IBOC DAB can include supplemental channels 94.1-1, 94.1-2, and 94.1-3. Highly specialized programming on supplemental channels can be delivered to tightly targeted audiences, creating more opportunities for advertisers to integrate their brand with program content. As used herein, multicasting includes the transmission of one or more programs in a single digital radio broadcasting channel or on a single digital radio broadcasting signal. Multicast content can include a main program service (MPS), supplemental program services (SPS), program service data (PSD), and/or other broadcast data.

National Radio Systems Committee, a standard-setting organization sponsored by the National Association of Broadcasters and the Consumer Electronics Association, adopted an IBOC standard, designated NRSC-5, in September 2011. NRSC-5 and its updates, the disclosure of which are incorporated herein by reference, set forth the requirements for broadcasting digital audio and ancillary data over AM and FM broadcast channels. The standard and its reference documents contain detailed explanations of the RF/transmission subsystem and the transport and service multiplex subsystems. Copies of the standard can be obtained from the NRSC at http://www.nrscstandards.org/SG/NRSC-5-C.asp. iBiquity's HD Radio technology is an implementation of the NRSC-5 IBOC standard. Further information regarding HD Radio technology can be found at www.hdradio.com and www.ibiquity.com.

Other types of digital radio broadcasting systems include satellite systems such as XM® Radio, Sirius®, and WorldSpace®, and terrestrial systems such as Digital Radio Mondiale™ (DRM), Eureka™ 147 (branded as DAB), DAB™ Version 2, and FMeXtra®. As used herein, the phrase "digital radio broadcasting" encompasses digital audio broadcasting including in-band on-channel broadcasting, as well as other digital terrestrial broadcasting and satellite broadcasting.

Emergency vehicles (e.g., ambulances, fire trucks, police cars, etc.) are experiencing an increasing challenge in responding to calls. Getting drivers' attention is increasingly difficult. Modern automobiles are designed to reduce outside noise, and entertainment systems provide auditory distractions that decrease drivers' awareness of warning sirens. Thus, for example, drivers may fail to make room for an emergency vehicle on a roadway because the drivers do not realize that the emergency vehicle is approaching. Traffic delays caused by drivers' failure to make room for emergency vehicles may prevent responders from arriving at an emergency scene in a timely manner. In addition, drivers' lack of awareness of approaching emergency vehicles results in numerous accidents between emergency vehicles and private vehicles.

The present inventor has observed a need to get the attention of drivers in the vicinity of an emergency vehicle during an emergency situation. The present inventor has further observed that it would be desirable to provide information to drivers regarding the approach of emergency vehicles, thus enabling the drivers to modify their behavior accordingly.

SUMMARY

Embodiments of the present disclosure are directed to systems and methods that may satisfy these needs. According to exemplary embodiments, a method for communicating an emergency alert message from a digital radio broadcast transmission system of a mobile vehicle to a digital radio broadcast receiver system is disclosed. In the method, data stored in a memory of a digital radio broadcast transmission system is read. The data includes first data comprising an emergency alert notification code and second data configured to be rendered by a digital radio broadcast receiver. The second data includes an emergency alert message. A digital radio broadcast signal including the first and second data is broadcasted using the digital radio broadcast transmission system from a mobile vehicle to end-user digital radio broadcast receivers. The digital radio broadcast signal is broadcasted at a predetermined frequency within an FM commercial broadcast band or an AM commercial broadcast band that is recognized by the digital radio broadcast receivers as an emergency notification frequency. The digital radio broadcast signal has characteristics that enable the signal to be decoded only by digital radio broadcast receivers located within a localized area in a proximity of the transmission system.

An example digital radio broadcast transmission system of a mobile vehicle includes a digital radio broadcast transmitter system configured for operation in a mobile vehicle, the digital radio broadcast transmitter system including a processing system. A memory is coupled to the processing system and is configured to read data stored in the memory. The data includes first data comprising an emergency alert notification code and second data configured to be rendered by a digital radio broadcast receiver. The second data includes an emergency alert message. A digital radio broadcast signal including the first and second data is processed for broadcasting to end-user digital radio broadcast receivers at a predetermined frequency within an FM commercial broadcast band or an AM commercial broadcast band that is recognized by the digital radio broadcast receivers as an emergency notification frequency. The digital radio broadcast signal has characteristics that enable the signal to be decoded only by digital radio broadcast receivers located within a localized area in a proximity of the transmission system.

An example article of manufacture comprising a non-transitory computer readable storage medium has computer program instructions for communicating an emergency alert message from a digital radio broadcast transmission system of a mobile vehicle to end-user digital radio broadcast receivers. The instructions when executed are adapted to cause a processing system of a digital radio broadcast transmitter system to read data stored in a memory. The data includes first data comprising an emergency alert notification code and second data configured to be rendered by end-user digital radio broadcast receivers. The second data includes an emergency alert message. A digital radio broadcast signal including the first and second data is processed for broadcasting at a predetermined frequency within an FM commercial broadcast band or an AM commercial broadcast band that is recognized by the digital radio broadcast receivers as an emergency notification frequency. The digital radio broadcast signal has characteristics that enable the signal to be decoded only by digital radio broadcast receivers located within a localized area in a proximity of the transmission system.

In another exemplary embodiment, a method for receiving an emergency alert message at a digital radio broadcast receiver system from a digital radio broadcast transmission system of a mobile vehicle is disclosed. In the method, the digital radio broadcast receiver system is controlled to automatically tune to an emergency notification frequency within an FM commercial broadcast band or an AM commercial broadcast band. The emergency notification frequency is a frequency at which a digital radio broadcast transmission system of a mobile vehicle broadcasts emergency alert messages. A digital radio broadcast signal broadcasted at the emergency notification frequency by the digital radio broadcast transmission system is received. The digital radio broadcast signal has characteristics that enable the signal to be decoded only by digital radio broadcast receivers located within a localized area in a proximity of the transmission system. First data comprising an emergency alert notification code is detected within the digital radio broadcast signal. Based on the detection of the first data, second data included within the digital radio broadcast signal is rendered at the digital radio broadcast receiver system. The second data includes an emergency alert message.

An example digital broadcast receiver system configured to receive an emergency alert message from a digital radio broadcast transmission system includes a processing system and a memory coupled to the processing system. The processing system is configured to control the digital radio broadcast receiver system to automatically tune to an emergency notification frequency within an FM commercial broadcast band or an AM commercial broadcast band. The emergency notification frequency is a frequency at which a digital radio broadcast transmission system of a mobile vehicle broadcasts emergency alert messages. A digital radio broadcast signal broadcasted at the emergency notification frequency by the digital radio broadcast transmission system is received. The digital radio broadcast signal has characteristics that enable the signal to be decoded only by digital radio broadcast receivers located within a localized area in a proximity of the transmission system. First data comprising an emergency alert notification code is detected within the digital radio broadcast signal. Based on the detection of the first data, second data included within the digital radio broadcast signal is rendered at the digital radio broadcast receiver system. The second data includes an emergency alert message. The processing system can be configured to carry out other steps in addition to those described above.

An example article of manufacture comprising a non-transitory computer readable storage medium has computer program instructions for receiving an emergency alert message at a digital radio broadcast receiver system from a digital radio broadcast transmission system of a mobile vehicle. The instructions when executed are adapted to cause a processing system to control a digital radio broadcast receiver system to automatically tune to an emergency notification frequency within an FM commercial broadcast band or an AM commercial broadcast band. The emergency notification frequency is a frequency at which a digital radio broadcast transmission system of a mobile vehicle broadcasts emergency alert messages. A digital radio broadcast signal broadcasted at the emergency notification frequency by the digital radio broadcast transmission system is received. The digital radio broadcast signal has characteristics that enable the signal to be decoded only by end-user digital radio broadcast receivers located within a localized area in a proximity of the transmission system. First data comprising an emergency alert notification code is detected within the digital radio broadcast signal. Based on the detection of the first data, second data included within the digital radio broadcast signal is rendered at the digital radio broadcast receiver system. The second data includes an emergency alert message. The processing system can be configured to carry out other steps in addition to those described above.

BRIEF DESCRIPTION OF THE DRAWINGS

These and other features, aspects, and advantages of the present disclosure will become better understood with regard to the following description, appended claims, and accompanying drawings wherein:

FIG. 5 is a schematic representation of a hybrid AM IBOC waveform;

FIG. 6 is a schematic representation of an all-digital AM IBOC waveform;

DESCRIPTION

The present disclosure describes systems and methods for transmitting warning messages from an emergency vehicle (e.g., ambulance, police car, fire truck, first responder vehicle, or other high-profile vehicle) via digital radio broadcasting to warn drivers of an approach of the emergency vehicle. In examples, the emergency vehicle utilizes a digital radio broadcast transmission system to transmit a digital radio broadcast signal in the FM commercial broadcast band or the AM commercial broadcast band. These commercial broadcast bands are recognized by those of skill in the art as being bands over which music, talk radio, news, weather and advertising, etc., are broadcast, and differ from other radio bands which may dedicated to other uses such as emergency response communication bands (e.g., police, fire, and other first responder uses), aircraft communication bands, marine communication bands, shortwave amateur radio bands, citizen band radio, and cellular telephone bands to name a few. The digital radio broadcast signal is received by a digital radio broadcast receiver system located in a second vehicle. In examples, the digital radio broadcast transmission system utilizes a relatively low-power transmitter, such that only vehicles within a localized area surrounding the emergency vehicle receive the digital radio broadcast signal. The digital radio broadcast signal may be encoded with emergency notification protocols and codes which trigger the digital radio broadcast receiver to render certain data. The rendered data may include, for example, an audio warning that is output via the vehicle's speakers and/or a textual warning message that is displayed on a display of the digital radio broadcast receiver system or another display of the vehicle.

FIGS. 1-10 and the accompanying description herein provide a general description of an exemplary IBOC system, exemplary broadcasting equipment structure and operation, and exemplary receiver structure and operation. FIGS. 11-18B and the accompanying description herein provide a detailed description of exemplary approaches for transmitting and receiving emergency alert messages via digital radio broadcasting techniques. Although aspects of this disclosure are presented in the context of an exemplary IBOC system, it should be understood that the present disclosure is not limited to IBOC systems and that the teachings herein are also applicable to other forms of digital radio broadcasting.

Exemplary Digital Radio Broadcasting System

Figure 1:
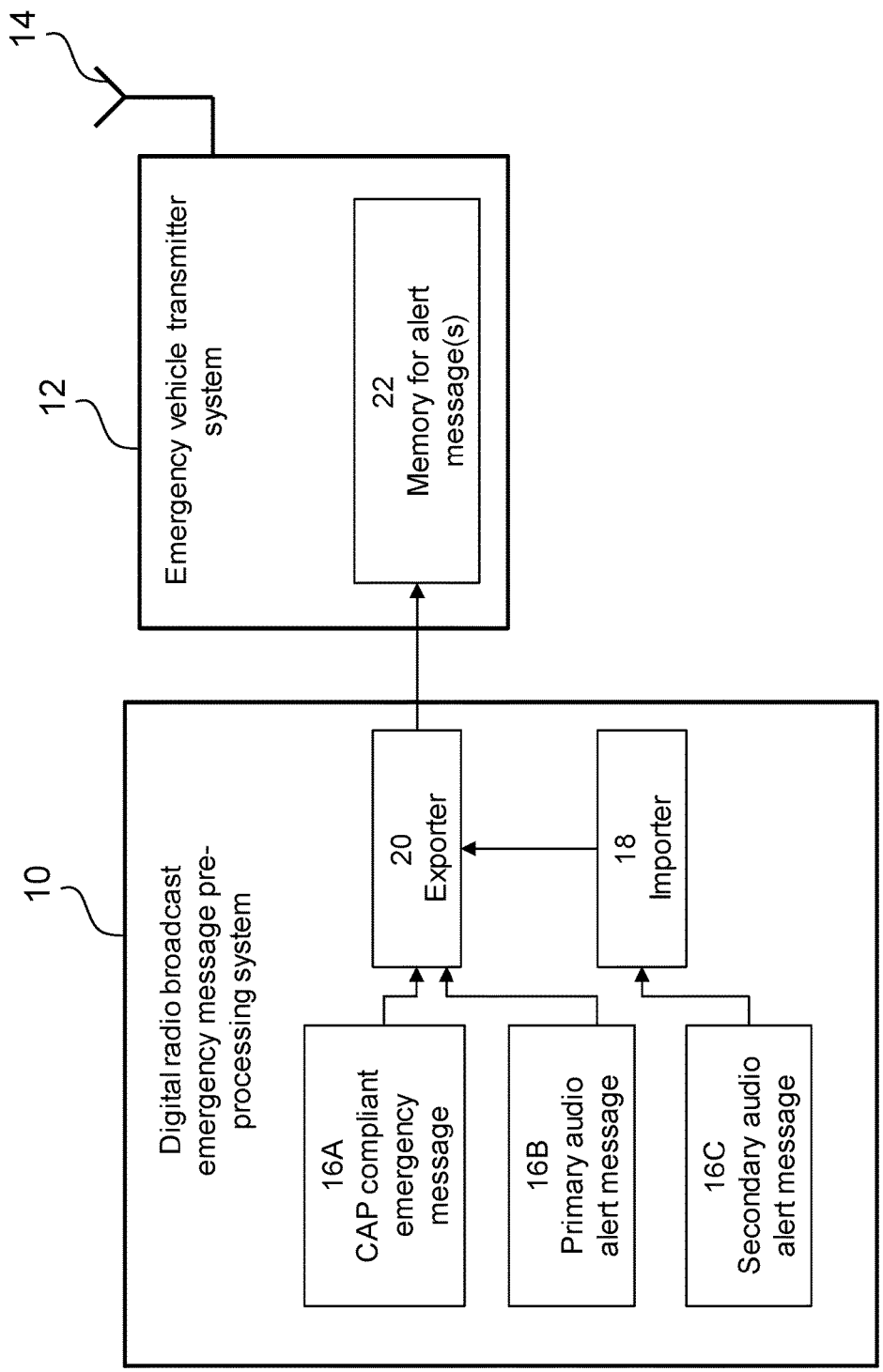
FIG. 1 illustrates a block diagram that provides an overview of a system in accordance with certain embodiments.

FIG. 1 is a functional block diagram of exemplary relevant components that support a digital radio broadcast transmission system of a mobile vehicle such as an emergency vehicle (e.g., police, fire, other first responder, etc.) that can be used to broadcast an FM IBOC digital radio broadcasting signal at a predetermined frequency in the commercial FM broadcast band or commercial AM broadcast band, wherein the signal comprises one or more alert messages to warn nearby vehicles of their proximity to the emergency vehicle. As shown in the example of FIG. 1, a digital radio broadcast emergency message pre-processing system 10 can prepare one or more emergency alert messages, which can then be delivered to an emergency vehicle transmitter system 12 for digital radio broadcast transmission via an antenna 14 to end-user digital radio broadcast receivers. The pre-processing system, which may be configured as a computer system comprising one or more central processing units (CPUs), comprises an importer 18, an exporter 20, and multiple sources of emergency alert messages, e.g., a Common Alerting Protocol (CAP)-compliant emergency message 16A, a primary audio alert message 16B, and a secondary audio alert message 16C. As shown in FIG. 1, a CAP compliant emergency message and a primary audio alert message 16B can be communicated directly to exporter 20, and a secondary audio alert message 16C can be communicated to importer 18, where the message can be processed for communication to the exporter 20. Pre-processed alert messages can then be communicated to a memory 22 of the emergency vehicle transmitter system 12 for further processing (e.g., encoding, interleaving, amplification by a low-power amplifier, etc.) for digital radio broadcast transmission at a predetermined frequency in the commercial FM or AM broadcast bands to nearby end-user digital radio broadcast receivers in nearby vehicles.

One or more of the alert messages 16A, 16B and 16C can be provided in the form of main program service (MPS) audio to the exporter, supplemental program service (SPS) audio to the importer, and SPS data to the importer 18. MPS audio can serve as the main audio source for the CAP compliant emergency message 16A in an example. MPS data or SPS data, also known as program service data (PSD), may include, in the context of this emergency alert example, additional alert information that may be visually or textually presented at an end-user receiver display. PSD may be encoded, for example, using ID3 tags tailored for alert messages. Supplemental program service data can include supplementary audio content as well as program service data.

The importer 18 may include hardware and software for pre-processing alert messages and may also be configured for supplying advanced application services (AAS). AAS can include any type of data that is not classified as MPS, SPS, or Station Information Service (SIS). SIS provides station information, such as call sign, absolute time, position correlated to GPS, etc. General examples of AAS include data services for electronic program guides, navigation maps, real-time traffic and weather information, multimedia applications, other audio services, and other data content. Additionally, in the context of emergency alert examples described herein, content for AAS may also include helpful information to be conveyed to nearby vehicles and can be supplied by a technician creating the alert message(s) or by other providers, e.g., remote providers, of alert messages, to the importer 18 via an application program interface (API). The importer 18 can encode and multiplex service data, SPS audio, and SPS data to produce data that is output to the exporter via a data link. The importer 18 may also encode a service information guide (SIG), in which it typically identifies and describes available services. For example, the SIG may include data identifying the type of alert message on the current frequency.

Figure 15:
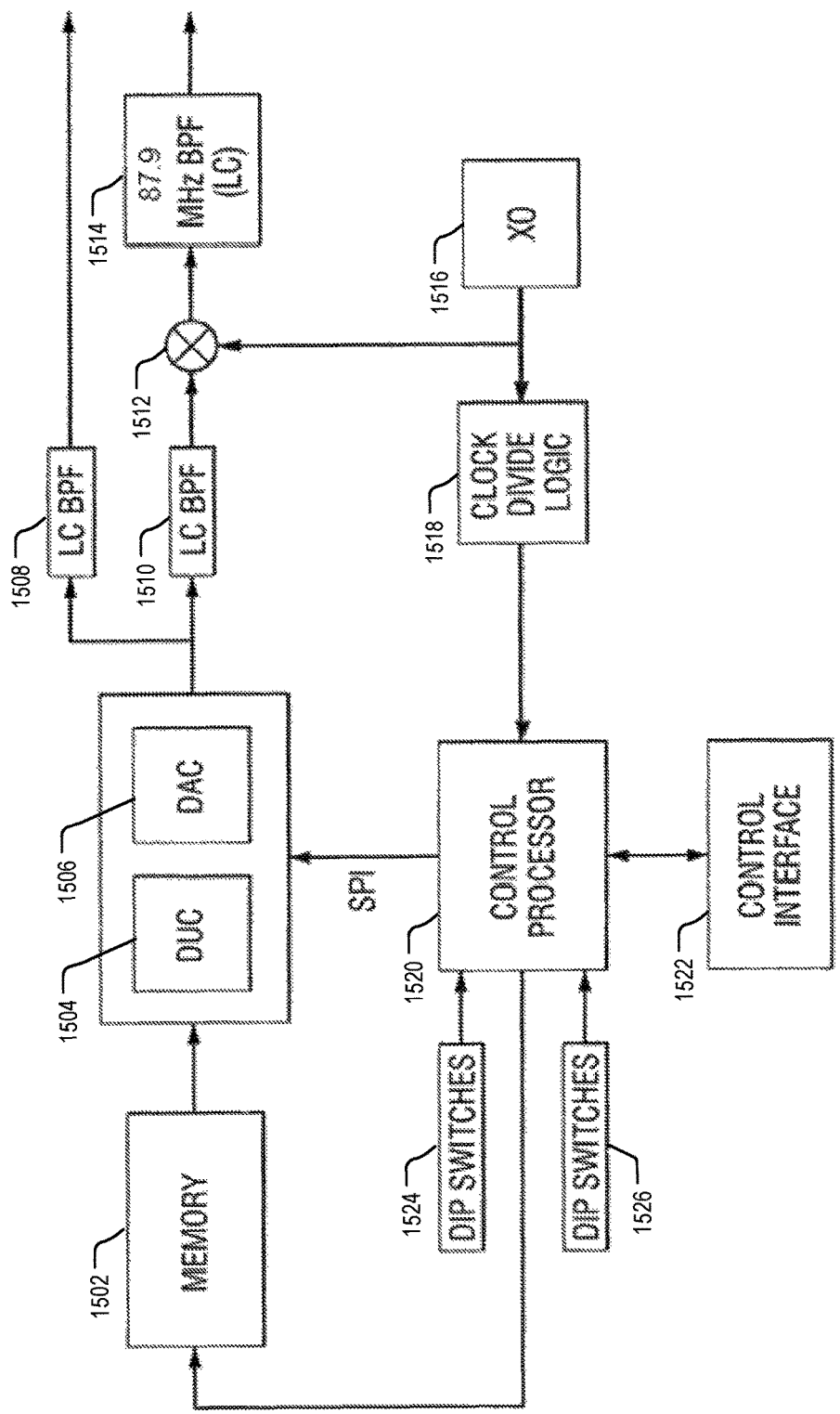
FIG. 15 is a block diagram depicting example components of a digital radio broadcast transmission system configured to broadcast emergency alert messages in accordance with certain embodiments.

The exporter 20 includes hardware and software suitable to supply the main program service and SIS of the alert message(s) for broadcasting. The exporter may also accept digital MPS audio of an alert message over an audio interface and compress the audio. The exporter also multiplexes MPS data and compressed digital MPS audio to produce output data that may be processed at the emergency vehicle transmission system 12 for broadcast to end-user digital radio broadcast receivers. Additional exemplary aspects of the emergency vehicle transmitter system are described elsewhere herein with regard to FIG. 15. While FIG. 15 illustrates additional components of an exemplary emergency vehicle transmitter system 12, FIG. 15 does not expressly illustrate a low-power amplifier or an antenna, which may of course be used to amplify and transmit a modulated signal encoded with one or more alert messages.

IBOC digital radio broadcasting signals can be transmitted in both AM and FM radio bands, using a variety of waveforms. The waveforms include an FM hybrid IBOC digital radio broadcasting waveform, an FM all-digital IBOC digital radio broadcasting waveform, an AM hybrid IBOC digital radio broadcasting waveform, and an AM all-digital IBOC digital radio broadcasting waveform.

Figure 2:
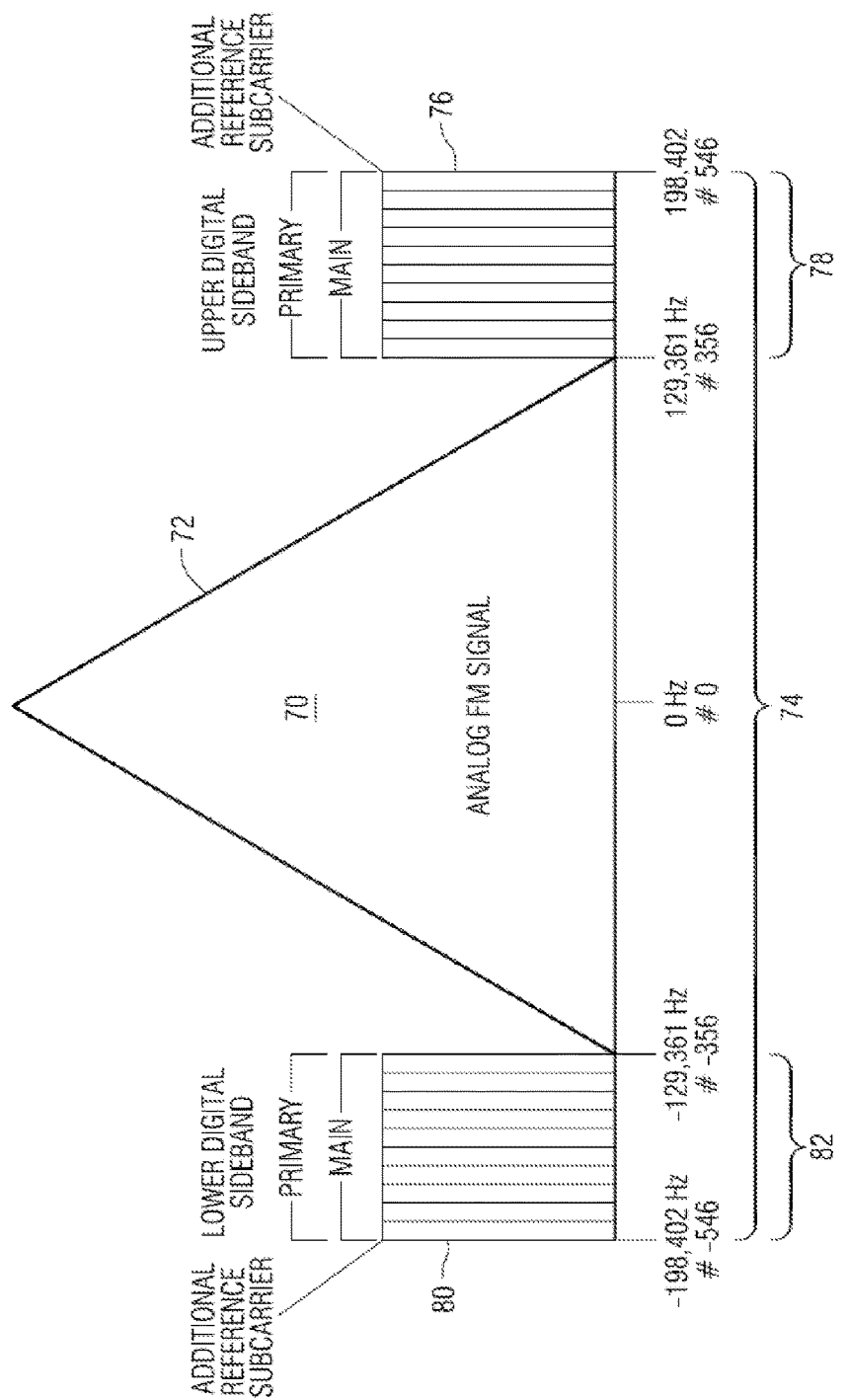
FIG. 2 is a schematic representation of a hybrid FM IBOC waveform.

FIG. 2 is a schematic representation of a hybrid FM IBOC waveform 70. The waveform includes an analog modulated signal 72 located in the center of a broadcast channel 74, a first plurality of evenly spaced orthogonally frequency division multiplexed subcarriers 76 in an upper sideband 78, and a second plurality of evenly spaced orthogonally frequency division multiplexed subcarriers 80 in a lower sideband 82.

The digitally modulated subcarriers are divided into partitions and various subcarriers are designated as reference subcarriers. A frequency partition is a group of 19 OFDM subcarriers containing 18 data subcarriers and one reference subcarrier.

The hybrid waveform includes an analog FM-modulated signal, plus digitally modulated primary main subcarriers. The subcarriers are located at evenly spaced frequency locations. The subcarrier locations are numbered from −546 to +546. In the waveform of FIG. 2, the subcarriers are at locations +356 to +546 and −356 to −546. Each primary main sideband is comprised of ten frequency partitions. Subcarriers 546 and −546, also included in the primary main sidebands, are additional reference subcarriers. The amplitude of each subcarrier can be scaled by an amplitude scale factor.

Figure 3:
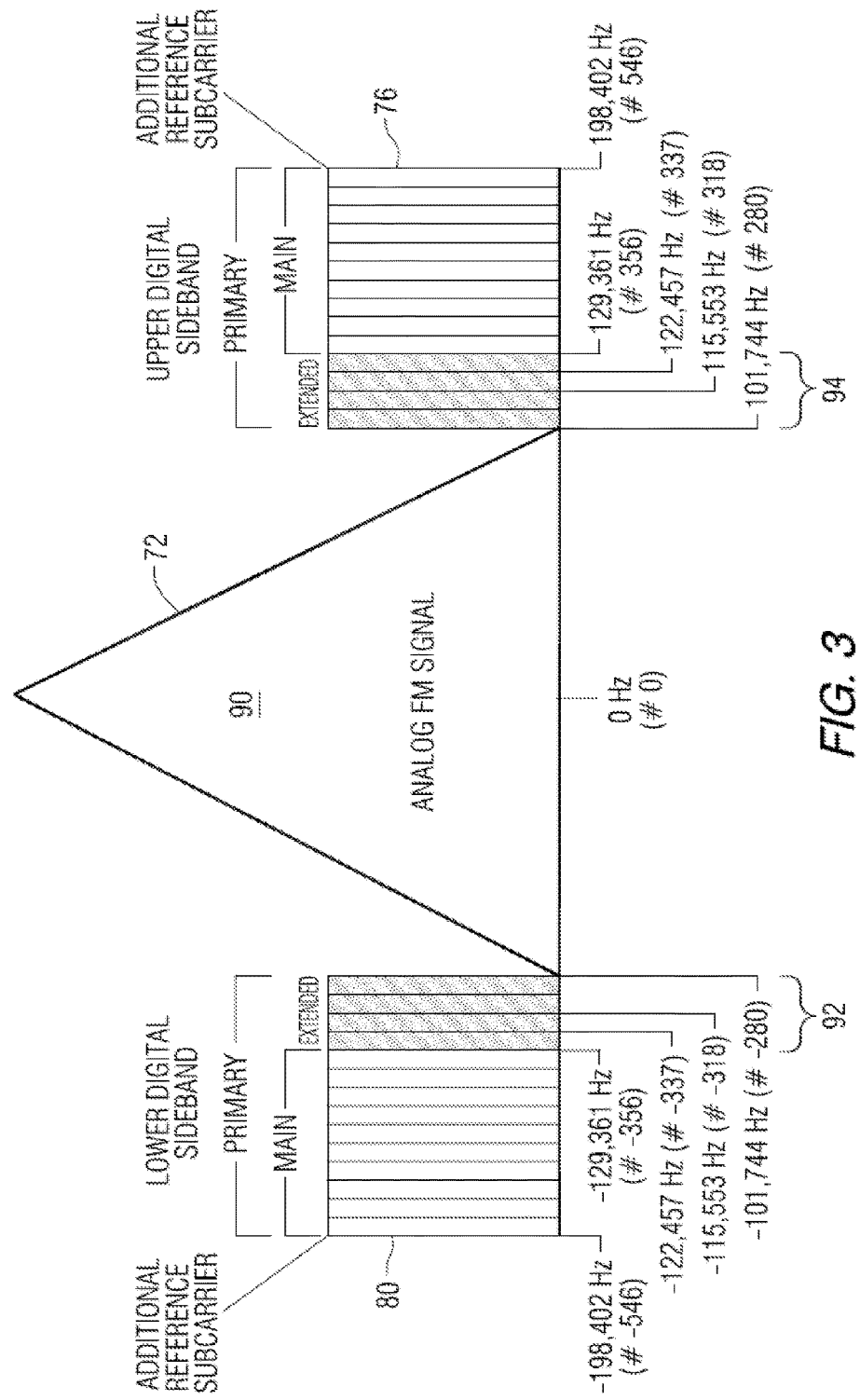
FIG. 3 is a schematic representation of an extended hybrid FM IBOC waveform.

FIG. 3 is a schematic representation of an extended hybrid FM IBOC waveform 90. The extended hybrid waveform is created by adding primary extended sidebands 92, 94 to the primary main sidebands present in the hybrid waveform. One, two, or four frequency partitions can be added to the inner edge of each primary main sideband. The extended hybrid waveform includes the analog FM signal plus digitally modulated primary main subcarriers (subcarriers +356 to +546 and −356 to −546) and some or all primary extended subcarriers (subcarriers +280 to +355 and −280 to −355).

The upper primary extended sidebands include subcarriers 337 through 355 (one frequency partition), 318 through 355 (two frequency partitions), or 280 through 355 (four frequency partitions). The lower primary extended sidebands include subcarriers −337 through −355 (one frequency partition), −318 through −355 (two frequency partitions), or −280 through −355 (four frequency partitions). The amplitude of each subcarrier can be scaled by an amplitude scale factor.

Figure 4:
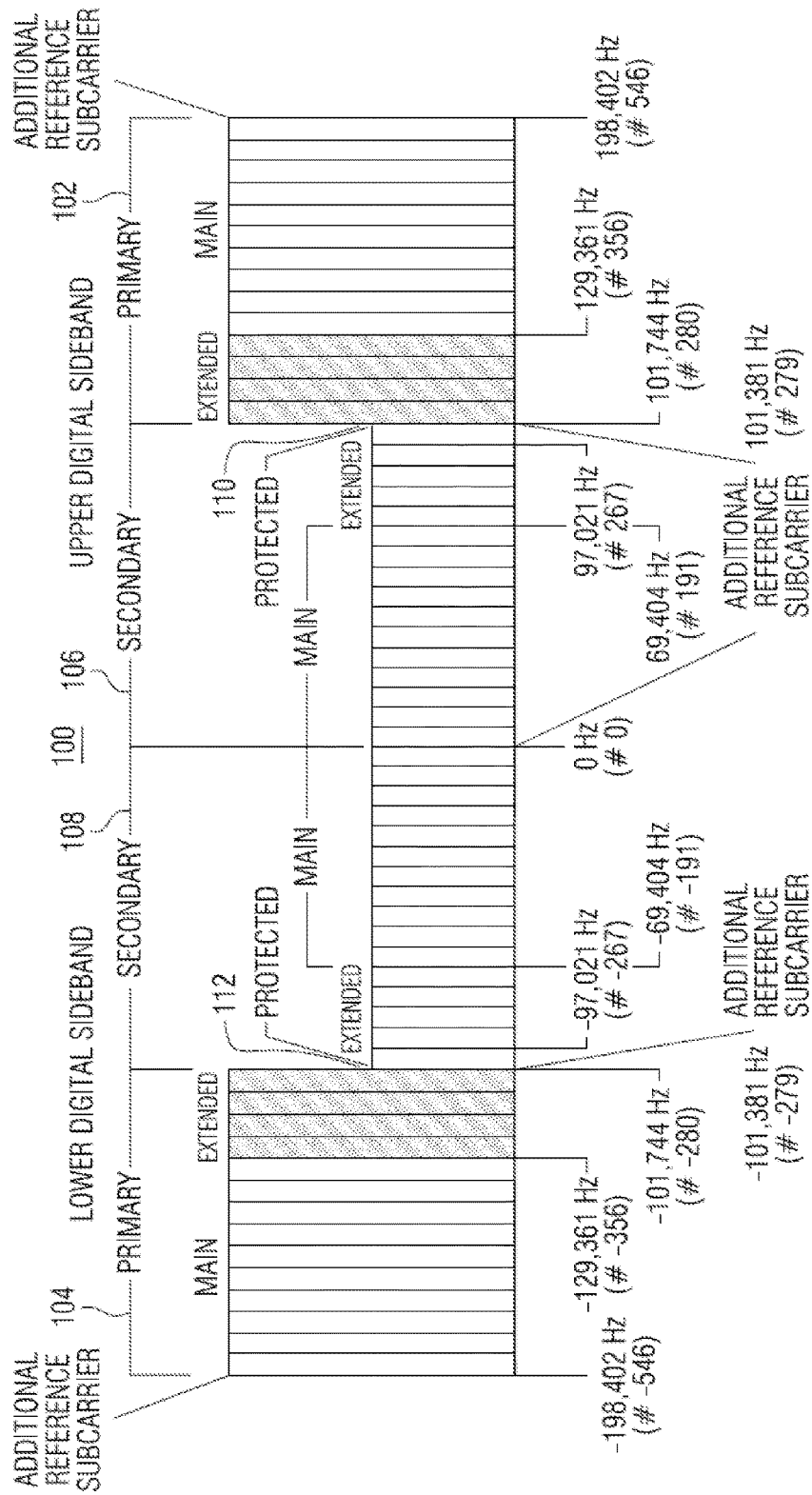
FIG. 4 is a schematic representation of an all-digital FM IBOC waveform.

FIG. 4 is a schematic representation of an all-digital FM IBOC waveform 100. The all-digital waveform is constructed by disabling the analog signal, fully extending the bandwidth of the primary digital sidebands 102, 104, and adding lower-power secondary sidebands 106, 108 in the spectrum vacated by the analog signal. The all-digital waveform in the illustrated embodiment includes digitally modulated subcarriers at subcarrier locations −546 to +546, without an analog FM signal.

In addition to the ten main frequency partitions, all four extended frequency partitions are present in each primary sideband of the all-digital waveform. Each secondary sideband also has ten secondary main (SM) and four secondary extended (SX) frequency partitions. Unlike the primary sidebands, however, the secondary main frequency partitions are mapped nearer to the channel center with the extended frequency partitions farther from the center.

Each secondary sideband also supports a small secondary protected (SP) region 110, 112 including 12 OFDM subcarriers and reference subcarriers 279 and −279. The sidebands are referred to as "protected" because they are located in the area of spectrum least likely to be affected by analog or digital interference. An additional reference subcarrier is placed at the center of the channel (0). Frequency partition ordering of the SP region does not apply since the SP region does not contain frequency partitions.

Each secondary main sideband spans subcarriers 1 through 190 or −1 through −190. The upper secondary extended sideband includes subcarriers 191 through 266, and the upper secondary protected sideband includes subcarriers 267 through 278, plus additional reference subcarrier 279. The lower secondary extended sideband includes subcarriers −191 through −266, and the lower secondary protected sideband includes subcarriers −267 through −278, plus additional reference subcarrier −279. The total frequency span of the entire all-digital spectrum is 396,803 Hz. The amplitude of each subcarrier can be scaled by an amplitude scale factor. The secondary sideband amplitude scale factors can be user selectable. Any one of the four may be selected for application to the secondary sidebands.

In each of the waveforms, the digital signal is modulated using orthogonal frequency division multiplexing (OFDM). OFDM is a parallel modulation scheme in which the data stream modulates a large number of orthogonal subcarriers, which are transmitted simultaneously. OFDM is inherently flexible, readily allowing the mapping of logical channels to different groups of subcarriers.

In the hybrid waveform, the digital signal is transmitted in primary main (PM) sidebands on either side of the analog FM signal in the hybrid waveform. The power level of each sideband is appreciably below the total power in the analog FM signal. The analog signal may be monophonic or stereophonic, and may include subsidiary communications authorization (SCA) channels.

In the extended hybrid waveform, the bandwidth of the hybrid sidebands can be extended toward the analog FM signal to increase digital capacity. This additional spectrum, allocated to the inner edge of each primary main sideband, is termed the primary extended (PX) sideband.

In the all-digital waveform, the analog signal is removed and the bandwidth of the primary digital sidebands is fully extended as in the extended hybrid waveform. In addition, this waveform allows lower-power digital secondary sidebands to be transmitted in the spectrum vacated by the analog FM signal.

FIG. 5 is a schematic representation of an AM hybrid IBOC digital radio broadcasting waveform 120. The hybrid format includes the conventional AM analog signal 122 (bandlimited to about ±5 kHz) along with a nearly 30 kHz wide digital radio broadcasting signal 124. The spectrum is contained within a channel 126 having a bandwidth of about 30 kHz. The channel is divided into upper 130 and lower 132 frequency bands. The upper band extends from the center frequency of the channel to about +15 kHz from the center frequency. The lower band extends from the center frequency to about −15 kHz from the center frequency.

The AM hybrid IBOC digital radio broadcasting signal format in one example comprises the analog modulated carrier signal 134 plus OFDM subcarrier locations spanning the upper and lower bands. Coded digital information representative of the audio or data signals to be transmitted (program material), is transmitted on the subcarriers. The symbol rate is less than the subcarrier spacing due to a guard time between symbols.

As shown in FIG. 5, the upper band is divided into a primary section 136, a secondary section 138, and a tertiary section 144. The lower band is divided into a primary section 140, a secondary section 142, and a tertiary section 143. For the purpose of this explanation, the tertiary sections 143 and 144 can be considered to include a plurality of groups of subcarriers labeled 146 and 152 in FIG. 5. Subcarriers within the tertiary sections that are positioned near the center of the channel are referred to as inner subcarriers, and subcarriers within the tertiary sections that are positioned farther from the center of the channel are referred to as outer subcarriers. The groups of subcarriers 146 and 152 in the tertiary sections have substantially constant power levels. FIG. 5 also shows two reference subcarriers 154 and 156 for system control, whose levels are fixed at a value that is different from the other sidebands.

The power of subcarriers in the digital sidebands is significantly below the total power in the analog AM signal. The level of each OFDM subcarrier within a given primary or secondary section is fixed at a constant value. Primary or secondary sections may be scaled relative to each other. In addition, status and control information is transmitted on reference subcarriers located on either side of the main carrier. A separate logical channel, such as an IBOC Data Service (IDS) channel can be transmitted in individual subcarriers just above and below the frequency edges of the upper and lower secondary sidebands. The power level of each primary OFDM subcarrier is fixed relative to the unmodulated main analog carrier. However, the power level of the secondary subcarriers, logical channel subcarriers, and tertiary subcarriers is adjustable.

Using the modulation format of FIG. 5, the analog modulated carrier and the digitally modulated subcarriers are transmitted within the channel mask specified for standard AM broadcasting in the United States. The hybrid system uses the analog AM signal for tuning and backup.

FIG. 6 is a schematic representation of the subcarrier assignments for an all-digital AM IBOC digital radio broadcasting waveform. The all-digital AM IBOC digital radio broadcasting signal 160 includes first and second groups 162 and 164 of evenly spaced subcarriers, referred to as the primary subcarriers, that are positioned in upper and lower bands 166 and 168. Third and fourth groups 170 and 172 of subcarriers, referred to as secondary and tertiary subcarriers respectively, are also positioned in upper and lower bands 166 and 168. Two reference subcarriers 174 and 176 of the third group lie closest to the center of the channel. Subcarriers 178 and 180 can be used to transmit program information data.

Figure 7:
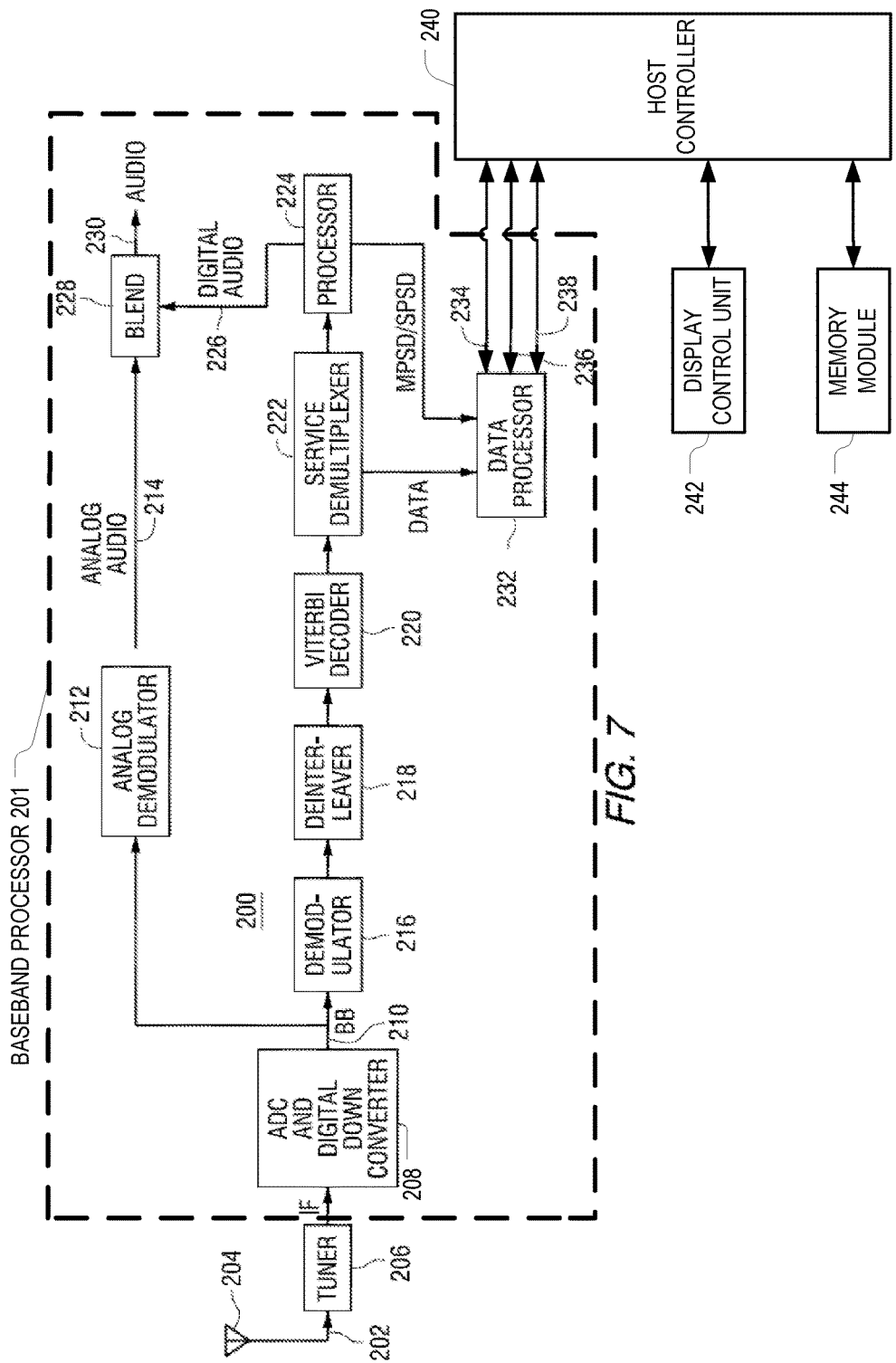
FIG. 7 is a functional block diagram of an AM IBOC digital radio broadcasting receiver in accordance with certain embodiments.

FIG. 7 is a simplified functional block diagram of the relevant components of an exemplary AM IBOC digital radio broadcasting receiver 200. While only certain components of the receiver 200 are shown for exemplary purposes, it should be apparent that the receiver may comprise a number of additional components and may be distributed among a number of separate enclosures having tuners and front-ends, speakers, remote controls, various input/output devices, etc. The receiver 200 has a tuner 206 that includes an input 202 connected to an antenna 204. The receiver also includes a baseband processor 201 that includes a digital down converter 208 for producing a baseband signal on line 210. An analog demodulator 212 demodulates the analog modulated portion of the baseband signal to produce an analog audio signal on line 214. A digital demodulator 216 demodulates the digitally modulated portion of the baseband signal. Then the digital signal is deinterleaved by a deinterleaver 218, and decoded by a Viterbi decoder 220. A service demultiplexer 222 separates main and supplemental program signals from data signals. A processor 224 processes the program signals to produce a digital audio signal on line 226. The analog and main digital audio signals are blended as shown in block 228, or a supplemental digital audio signal is passed through, to produce an audio output on line 230. A data processor 232 processes the data signals and produces data output signals on lines 234, 236 and 238. The data lines 234, 236, and 238 may be multiplexed together onto a suitable bus such as an inter-integrated circuit (I²C), serial peripheral interface (SPI), universal asynchronous receiver/transmitter (UART), or universal serial bus (USB). The data signals can include, for example, SIS, MPS data, SPS data, and one or more AAS.

The host controller 240 receives and processes the data signals (e.g., the SIS, MPSD, SPSD, and AAS signals). The host controller 240 comprises a microcontroller that is coupled to the display control unit (DCU) 242 and memory module 244. Any suitable microcontroller could be used such as an Atmel® AVR 8-bit reduced instruction set computer (RISC) microcontroller, an advanced RISC machine (ARM®) 32-bit microcontroller or any other suitable microcontroller. Additionally, a portion or all of the functions of the host controller 240 could be performed in a baseband processor (e.g., the processor 224 and/or data processor 232). The DCU 242 comprises any suitable I/O processor that controls the display, which may be any suitable visual display such as an LCD or LED display. In certain embodiments, the DCU 242 may also control user input components via touch-screen display. In certain embodiments the host controller 240 may also control user input from a keyboard, dials, knobs or other suitable inputs. The memory module 244 may include any suitable data storage medium such as RAM, Flash ROM (e.g., an SD memory card), and/or a hard disk drive. In certain embodiments, the memory module 244 may be included in an external component that communicates with the host controller 240 such as a remote control.

Figure 8:
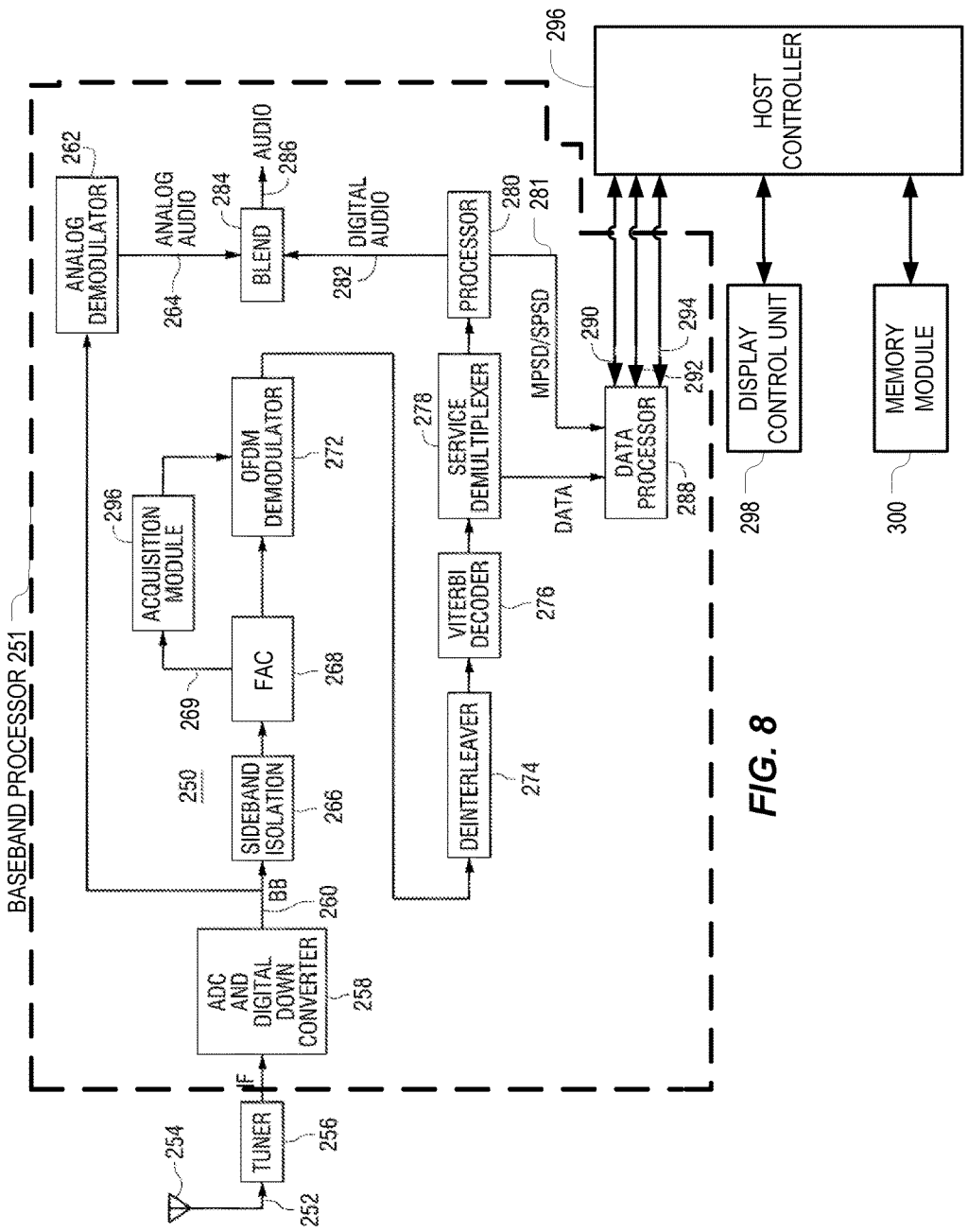
FIG. 8 is a functional block diagram of an FM IBOC digital radio broadcasting receiver in accordance with certain embodiments.

FIG. 8 is a simplified functional block diagram of the relevant components of an exemplary FM IBOC digital radio broadcasting receiver 250. While only certain components of the receiver 250 are shown for exemplary purposes, it should be apparent that the receiver may comprise a number of additional components and may be distributed among a number of separate enclosures having tuners and front-ends, speakers, remote controls, various input/output devices, etc. The exemplary receiver includes a tuner 256 that has an input 252 connected to an antenna 254. The receiver also includes a baseband processor 251. The IF signal from the tuner 256 is provided to an analog-to-digital converter and digital down converter 258 to produce a baseband signal at output 260 comprising a series of complex signal samples. The signal samples are complex in that each sample comprises a "real" component and an "imaginary" component. An analog demodulator 262 demodulates the analog modulated portion of the baseband signal to produce an analog audio signal on line 264. The digitally modulated portion of the sampled baseband signal is next filtered by isolation filter 266, which has a pass-band frequency response comprising the collective set of subcarriers $f_1$-$f_n$ present in the received OFDM signal. First adjacent canceller (FAC) 268 suppresses the effects of a first-adjacent interferer. Complex signal 269 is routed to the input of acquisition module 296, which acquires or recovers OFDM symbol timing offset or error and carrier frequency offset or error from the received OFDM symbols as represented in received complex signal 298. Acquisition module 296 develops a symbol timing offset $\Delta t$ and carrier frequency offset $\Delta f$, as well as status and control information. The signal is then demodulated (block 272) to demodulate the digitally modulated portion of the baseband signal. Then the digital signal is deinterleaved by a deinterleaver 274, and decoded by a Viterbi decoder 276. A service demultiplexer 278 separates main and supplemental program signals from data signals. A processor 280 processes the main and supplemental program signals to produce a digital audio signal on line 282 and MPSD/SPSD 281. The analog and main digital audio signals are blended as shown in block 284, or the supplemental program signal is passed through, to produce an audio output on line 286. A data processor 288 processes the data signals and produces data output signals on lines 290, 292 and 294. The data lines 290, 292 and 294 may be multiplexed together onto a suitable bus such as an I²C, SPI, UART, or USB. The data signals can include, for example, SIS, MPS data, SPS data, and one or more AAS.

The host controller 296 receives and processes the data signals (e.g., SIS, MPS data, SPS data, and AAS). The host controller 296 comprises a microcontroller that is coupled to the DCU 298 and memory module 300. Any suitable microcontroller could be used such as an Atmel® AVR 8-bit RISC microcontroller, an advanced RISC machine (ARM®) 32-bit microcontroller or any other suitable microcontroller. Additionally, a portion or all of the functions of the host controller 296 could be performed in a baseband processor (e.g., the processor 280 and/or data processor 288). The DCU 298 comprises any suitable I/O processor that controls the display, which may be any suitable visual display such as an LCD or LED display. In certain embodiments, the DCU 298 may also control user input components via a touch-screen display. In certain embodiments the host controller 296 may also control user input from a keyboard, dials, knobs or other suitable inputs. The memory module 300 may include any suitable data storage medium such as RAM, Flash ROM (e.g., an SD memory card), and/or a hard disk drive. In certain embodiments, the memory module 300 may be included in an external component that communicates with the host controller 296 such as a remote control.

In practice, many of the signal processing functions shown in the receivers of FIGS. 7 and 8 can be implemented using one or more integrated circuits. For example, while in FIGS. 7 and 8 the signal processing block, host controller, DCU, and memory module are shown as separate components, the functions of two or more of these components could be combined in a single processor (e.g., a System on a Chip (SoC)).

Figure 9A:
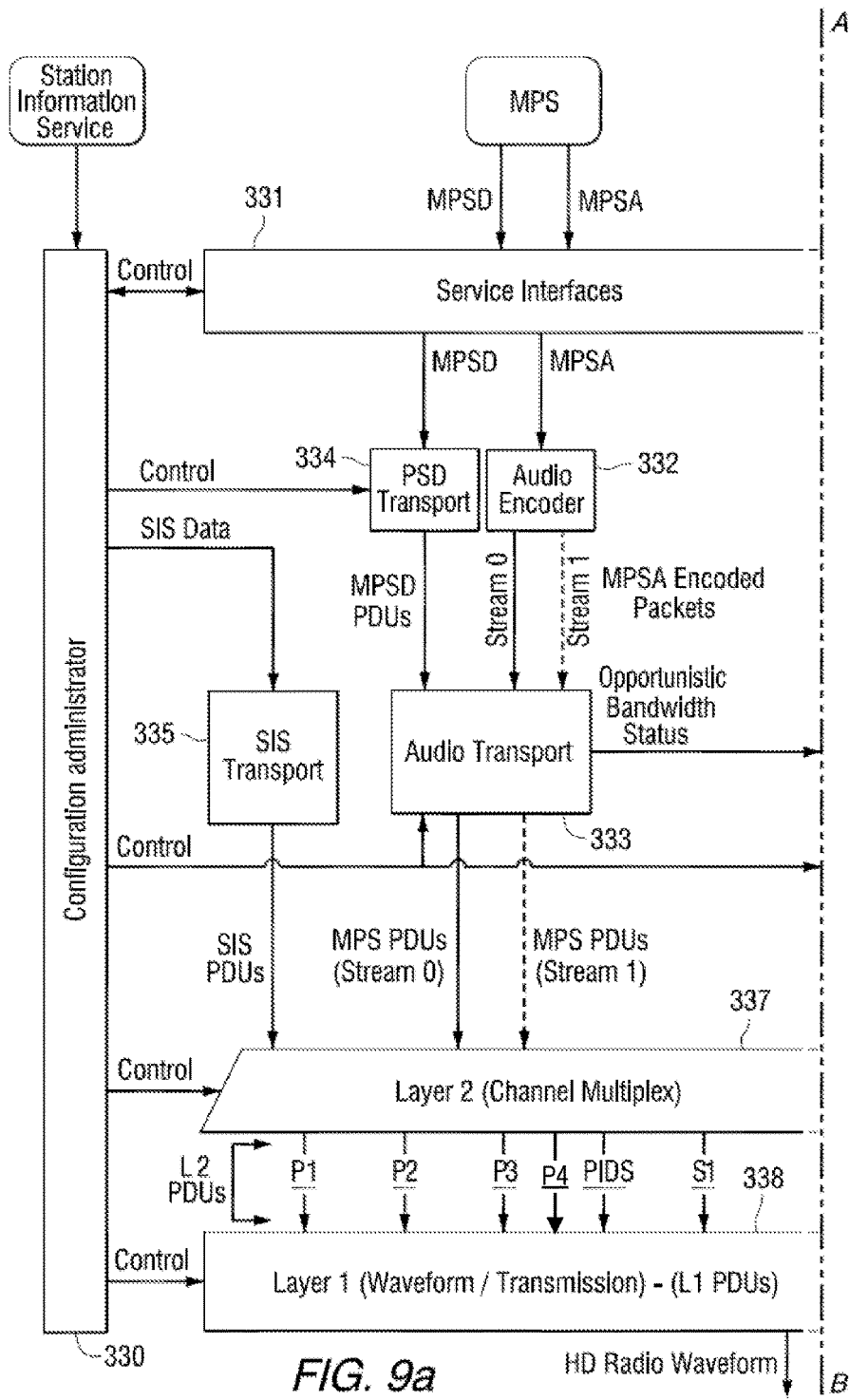
FIGS. 9a and 9b are diagrams of an IBOC digital radio broadcasting logical protocol stack from the broadcast perspective.
Figure 9B:
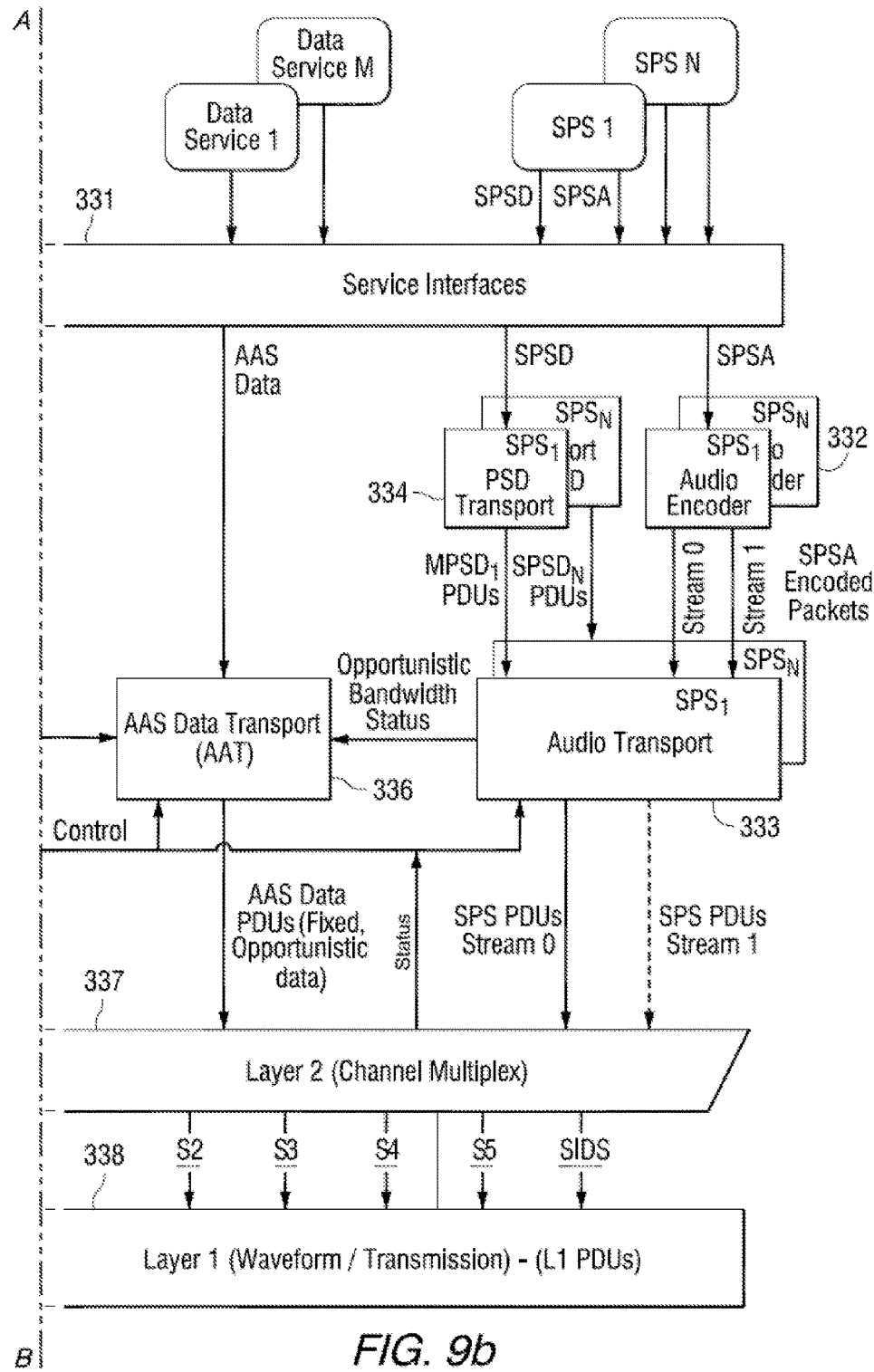

FIGS. 9a and 9b are diagrams of an IBOC digital radio broadcasting logical protocol stack from the transmitter perspective. From the receiver perspective, the logical stack will be traversed in the opposite direction. Most of the data being passed between the various entities within the protocol stack are in the form of protocol data units (PDUs). A PDU is a structured data block that is produced by a specific layer (or process within a layer) of the protocol stack. The PDUs of a given layer may encapsulate PDUs from the next higher layer of the stack and/or include content data and protocol control information originating in the layer (or process) itself. The PDUs generated by each layer (or process) in the transmitter protocol stack are inputs to a corresponding layer (or process) in the receiver protocol stack.

As shown in FIGS. 9a and 9b, there is a configuration administrator 330, which is a system function that supplies configuration and control information to the various entities within the protocol stack. The configuration/control information can include user defined settings, as well as information generated from within the system such as GPS time and position. The service interfaces 331 represent the interfaces for all services. The service interface may be different for each of the various types of services. For example, for MPS audio and SPS audio, the service interface may be an audio card. For MPS data and SPS data the interfaces may be in the form of different APIs. For all other data services the interface is in the form of a single API. An audio encoder 332 encodes both MPS audio and SPS audio to produce core (Stream 0) and optional enhancement (Stream 1) streams of MPS and SPS audio encoded packets, which are passed to audio transport 333. Audio encoder 332 also relays unused capacity status to other parts of the system, thus allowing the inclusion of opportunistic data. MPS and SPS data is processed by PSD transport 334 to produce MPS and SPS data PDUs, which are passed to audio transport 333. Audio transport 333 receives encoded audio packets and PSD PDUs and outputs bit streams containing both compressed audio and program service data. The SIS transport 335 receives SIS data from the configuration administrator and generates SIS PDUs. A SIS PDU can contain station identification and location information, indications regarding provided audio and data services, as well as absolute time and position correlated to GPS, as well as other information conveyed by the station. The AAS data transport 336 receives AAS data from the service interface, as well as opportunistic bandwidth data from the audio transport, and generates AAS data PDUs, which can be based on quality of service parameters. The transport and encoding functions are collectively referred to as Layer 4 of the protocol stack and the corresponding transport PDUs are referred to as Layer 4 PDUs or L4 PDUs. Layer 2, which is the channel multiplex layer, (337) receives transport PDUs from the SIS transport, AAS data transport, and audio transport, and formats them into Layer 2 PDUs. A Layer 2 PDU includes protocol control information and a payload, which can be audio, data, or a combination of audio and data. Layer 2 PDUs are routed through the correct logical channels to Layer 1 (338), wherein a logical channel is a signal path that conducts L1 PDUs through Layer 1 with a specified grade of service, and possibly mapped into a predefined collection of subcarriers.

Layer 1 data in an IBOC system can be considered to be temporally divided into frames (e.g., modem frames). In typical HD Radio applications, each modem frame has a frame duration ($T_f$) of approximately 1.486 seconds. It will be appreciated that in other broadcast applications, a frame may have different durations. Each modem frame includes an absolute layer 1 frame number (ALFN) in the SIS, which is a sequential number assigned to every Layer 1 frame. This ALFN corresponds to the broadcast starting time of a modem frame. The start time of ALFN 0 was 00:00:00 Universal Coordinated Time (UTC) on Jan. 6, 1980 and each subsequent ALFN is incremented by one from the previous ALFN. Thus the present time can be calculated by multiplying the next frame's ALFN with $T_f$ and adding the total to the start time of ALFN 0.

There are multiple Layer 1 logical channels based on service mode, wherein a service mode is a specific configuration of operating parameters specifying throughput, performance level, and selected logical channels. The number of active Layer 1 logical channels and the characteristics defining them vary for each service mode. Status information is also passed between Layer 2 and Layer 1. Layer 1 converts the PDUs from Layer 2 and system control information into an AM or FM IBOC digital radio broadcasting waveform for transmission. Layer 1 processing can include scrambling, channel encoding, interleaving, OFDM subcarrier mapping, and OFDM signal generation. The output of OFDM signal generation is a complex, baseband, time domain pulse representing the digital portion of an IBOC signal for a particular symbol. Discrete symbols are concatenated to form a continuous time domain waveform, which is modulated to create an IBOC waveform for transmission.

Figure 10:
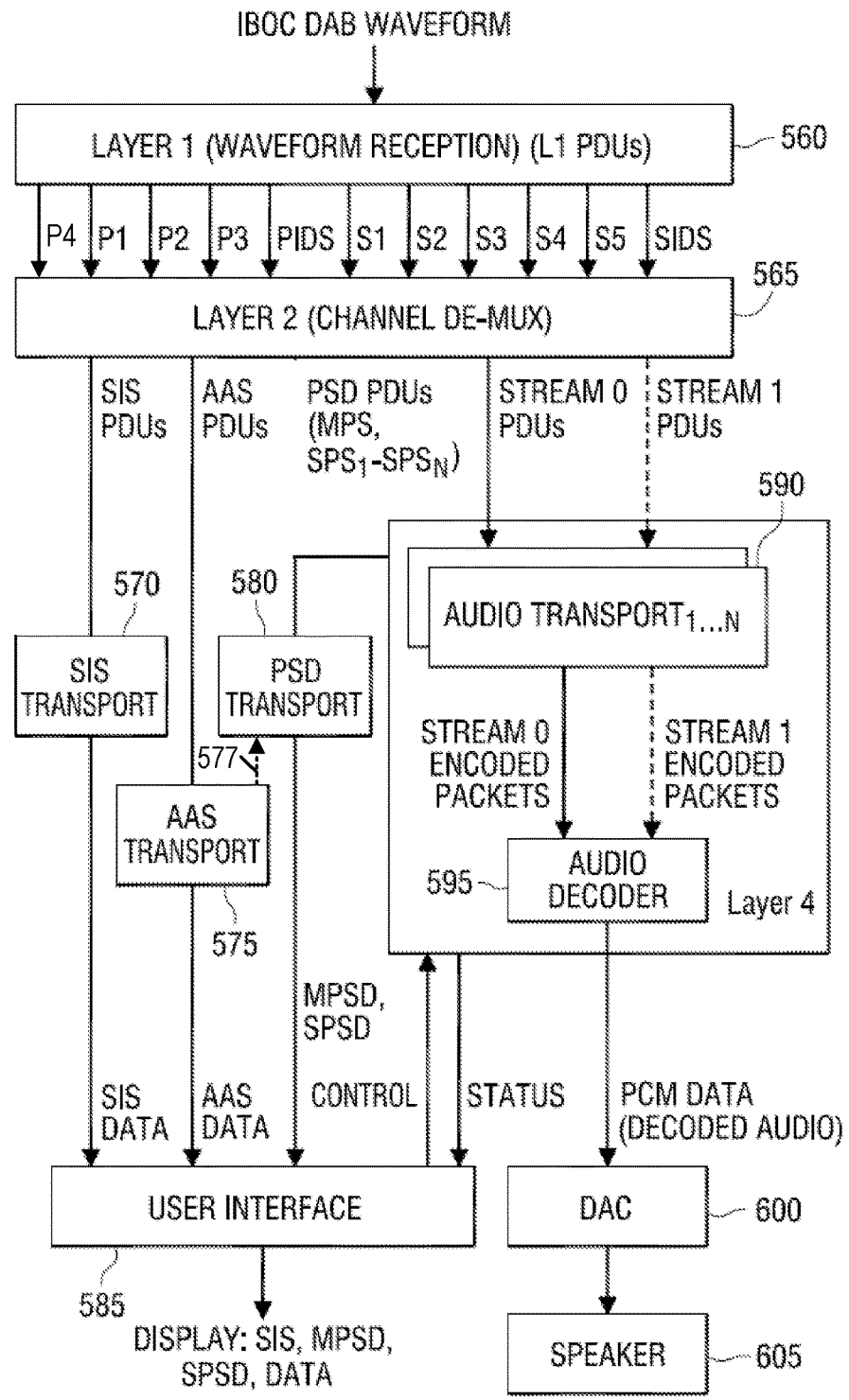
FIG. 10 is a diagram of an IBOC digital radio broadcasting logical protocol stack from the receiver perspective.

FIG. 10 shows a logical protocol stack from the receiver perspective. An IBOC waveform is received by the physical layer, Layer 1 (560), which demodulates the signal and processes it to separate the signal into logical channels. The number and kind of logical channels will depend on the service mode, and may include logical channels P1-P4, Primary IBOC Data Service Logical Channel (PIDS), S1-S5, and SIDS. Layer 1 produces L1 PDUs corresponding to the logical channels and sends the PDUs to Layer 2 (565), which demultiplexes the L1 PDUs to produce SIS PDUs, AAS PDUs, and Stream 0 (core) audio PDUs and Stream 1 (optional enhanced) audio PDUs. The SIS PDUs are then processed by the SIS transport 570 to produce SIS data, the AAS PDUs are processed by the AAS transport 575 to produce AAS data, and the PSD PDUs are processed by the PSD transport 580 to produce MPS data (MPSD) and any SPS data (SPSD). Encapsulated PSD data may also be included in AAS PDUs, thus processed by the AAS transport processor 575 and delivered on line 577 to PSD transport processor 580 for further processing and producing MPSD or SPSD. The SIS data, AAS data, MPSD and SPSD are then sent to a user interface 585. The SIS data, if requested by a user, can then be displayed. Likewise, MPSD, SPSD, and any text based or graphical AAS data can be displayed. The Stream 0 and Stream 1 PDUs are processed by Layer 4, comprised of audio transport 590 and audio decoder 595. There may be up to N audio transports corresponding to the number of programs received on the IBOC waveform. Each audio transport produces encoded MPS packets or SPS packets, corresponding to each of the received programs. Layer 4 receives control information from the user interface, including commands such as to store or play programs, and information related to seek or scan for radio stations broadcasting an all-digital or hybrid IBOC signal. Layer 4 also provides status information to the user interface.

Figure 11:
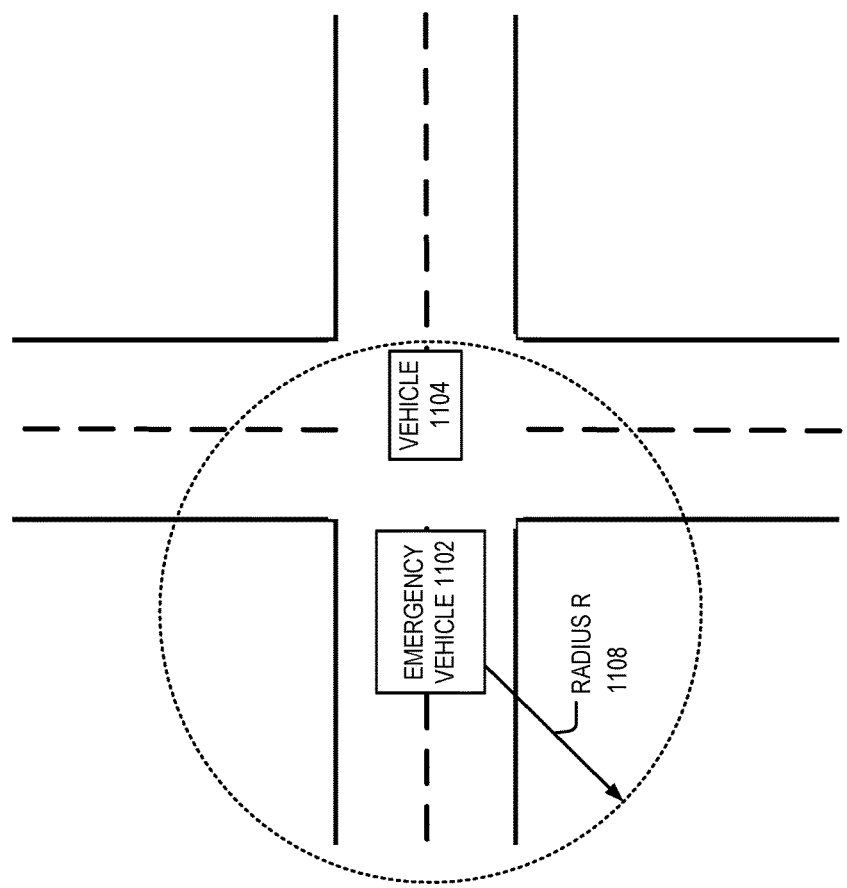
FIGS. 11 and 12 depict example scenarios in which the subject matter of the present disclosure may be utilized.

The following describes exemplary systems and methods for utilizing digital radio broadcasting technology to provide information to drivers regarding the approach of emergency vehicles, in accordance with exemplary embodiments. FIG. 11 depicts an example scenario in which the subject matter of the present disclosure may be utilized. In this figure, an emergency vehicle 1102 (e.g., fire truck, ambulance, police cruiser, etc.) is equipped with a digital radio broadcast transmission system. The digital radio broadcast transmission system may be used to broadcast emergency messages notifying other vehicles of an oncoming approach of the emergency vehicle 1102. In the example of FIG. 11, a vehicle 1104 receives emergency messages regarding the oncoming approach of the emergency vehicle 1102. The vehicle 1104 is equipped with an end-user digital radio broadcast receiver system configured to receive and render the emergency messages.

The digital radio broadcast transmission system of the emergency vehicle 1102 may use a relatively low-power transmitter, such that only vehicles located within a localized area (e.g., of predetermined expanse) in a proximity of the emergency vehicle 1102 receive and/or decode the emergency messages. In the example of FIG. 11, the localized area is a circular area surrounding the emergency vehicle 1102 and has a radius 1108. In other examples, the localized area has a different shape or profile. In examples, the digital radio broadcast signal is broadcasted at a power level that is under 1 watt to provide a warning announcement within a 1000 foot radius of the emergency vehicle 1102. This may provide an approximately 15 second warning to the vehicle 1104 when the emergency vehicle 1102 is approaching at 45 miles per hour (e.g., the emergency vehicle 1102 may reach the vehicle 1104 within approximately 15 seconds of the vehicle 1104 first receiving notification of the emergency vehicle's oncoming approach). In other examples, the localized area is a circular area having a smaller or larger radius. Broadcasting at the relatively low power level may minimize interference with other radio broadcasts.

The digital radio broadcast transmission system utilized by the emergency vehicle 1102 may transmit the emergency messages at a fixed (e.g., predetermined) frequency within the FM commercial broadcast band or the AM commercial broadcast band. The FM commercial broadcast band may vary in different regions of the world. In ITU Region 1 (i.e., Europe, China, and Africa) the FM commercial broadcast band spans from 87.5 MHz to 108.0 MHz. In ITU Region 2 (the Americas), the FM commercial broadcast band spans from 87.9 MHz to 107.9 MHz. In Japan, the FM commercial broadcast band spans from 76.0 MHz to 90 MHz. In other regions, the FM commercial broadcast band may span other frequency ranges. Similarly, the AM commercial broadcast band may likewise vary in different regions of the world. In ITU Regions 1 and 3 (i.e., Europe, Africa, China and Asia Pacific Regions), the AM commercial broadcast band spans 531-1611 kHz with 9 kHz spacing. In ITU Region 2 (the Americas), the AM commercial broadcast band spans 540-1710 kHz (including the expanded band) with 10 kHz spacing. Elsewhere in this description, the FM commercial broadcast band may simply be referred to as the FM broadcast band (i.e., without the word "commercial" inserted) for brevity, and likewise for the AM commercial broadcast band.

In examples, the fixed frequency utilized by the digital radio broadcast transmission system can be an unused frequency within the FM broadcast band (e.g., 87.9 MHz in the United States), such that interference with commercial radio broadcasts at other FM frequencies is minimized. In other examples, the emergency messages are transmitted at a fixed frequency that is not in the FM broadcast band. For example, the public service band (e.g., 150 MHz-160 MHz) may be utilized in some embodiments. The fixed frequency utilized by the digital radio broadcast transmission system is a frequency that is known to the digital radio broadcast receiver system of the vehicle 1104 as an emergency notification frequency.

The digital radio broadcast transmission system is included within the mobile emergency vehicle 1102. The digital radio broadcast transmission system utilized by the emergency vehicle 1102 comprises an HD Radio transmitter, in examples. This transmitter may be integrated with a siren system of the emergency vehicle 1102, such that the transmitter is enabled automatically upon activation of the siren system. In other examples, the transmitter may be separate from the siren system and manually enabled (e.g., via a switch). As described in further detail below with reference to FIG. 15, the digital radio broadcast transmission system may comprise a digital up-converter system, such that a digital radio broadcasting waveform is converted from a lower frequency to a higher RF frequency prior to being broadcasted. For example, within the digital radio broadcast transmission system, a field-programmable gate array (FPGA) or other controller device may read a pre-recorded, digitized digital radio broadcasting waveform from a memory (e.g., a flash memory), and the digitized waveform may then be up-converted to a desired RF frequency for transmission. The digital radio broadcast transmission system may continuously loop the waveform message until disabled by the operator or until another condition is met (e.g., the siren system is disabled, the message has been looped a predetermined number of times, etc.).

In examples, the digital radio broadcast signal transmitted by the transmission system is formatted in accordance with the digital radio IBOC broadcast standard, described above. The transmitted digital radio broadcast signal may provide a Common Alerting Protocol (CAP)-compliant emergency alert protocol, unique warning codes to identify an approaching emergency vehicle, multiple audio announcements in various languages, and multi-lingual text notifications, in examples. Details of the transmitted digital radio broadcast signal are described below.

As noted above, the fixed frequency utilized by the digital radio broadcast transmission system may be a frequency that is known to the end-user digital radio broadcast receiver system of the vehicle 1104 as an emergency notification frequency. In examples, the digital radio broadcast receiver system tunes to the emergency notification frequency automatically and without prompting by a human user. This automatic tuning enables the receiver system to receive and render emergency messages without any action on the part of the user. The emergency messages may comprise, for example, audible warnings and/or visual (e.g., textual) warnings that are rendered by the digital radio broadcast receiver system. The digital radio broadcast receiver system of the vehicle 1104 comprises an HD Radio receiver, in examples.

The digital radio broadcast receiver system may be configured to tune to the emergency notification frequency and receive the emergency messages while the receiver system is receiving a radio signal (e.g., a digital radio broadcast signal, an analog radio signal, etc.) at a second frequency. The second frequency is a frequency that is not the emergency notification frequency and may be, for example, a user-selected frequency corresponding to a radio station. Further, the digital radio broadcast receiver system may be configured to tune to the emergency notification frequency and receive the emergency messages while audio from another source (e.g., MP3 player, Bluetooth source, CD, DVD, other radio signal, etc.) is being rendered by the receiver system. In examples, the digital radio broadcast receiver system may tune to the emergency notification frequency and receive emergency messages via a "background" process that is imperceptible to the human user.

In examples, the rendering of the emergency messages (e.g., rendering audio and/or visual data included in the emergency messages, etc.) may interrupt a rendering of other data at the digital radio broadcast receiver system. In this manner, the user is notified of the approach of the emergency vehicle 1102 even if he or she is listening to other audio or viewing other data on a display. The ability to interrupt a rendering of other data with a warning message may be referred to herein as a "break-through" functionality of the receiver system.

The end-user digital radio broadcast receiver system may periodically (e.g., every 2 seconds) or continuously tune to the emergency notification frequency to determine whether an emergency alert message is being broadcasted. In examples, the digital radio broadcast signal transmitted by the digital radio broadcast transmission system of the emergency vehicle 1102 includes (i) first data comprising an emergency alert notification code, and (ii) second data configured to be rendered by the digital radio broadcast receiver. When the digital radio broadcast receiver system tunes to the emergency notification frequency and detects a presence of a digital radio broadcast signal at this frequency, the receiver receives the signal and detects whether the emergency alert notification code is included within the signal. If the emergency alert notification code is not included in the signal, this indicates that the signal does not include an emergency alert message. If the emergency alert notification code is included in the signal, this indicates that the signal includes an emergency alert message.

Based on the detection of the emergency alert notification code within the digital radio broadcast signal, the second data included in the signal may be rendered at the digital radio broadcast receiver system. The second data may include, for example, one or more of audio, video, text, still images, and multimedia. Thus, for example, when the emergency alert notification code is detected in the received digital radio broadcast signal, the receiver system may play an audible message and/or notify the driver with text or other display indicators. The audible message and/or display indicators may inform the driver that an emergency vehicle is approaching, for instance. In examples, advanced vehicle systems may utilize the notification alert to control driving functions and initiate reduced speed or braking functions, for example.

Figure 12:
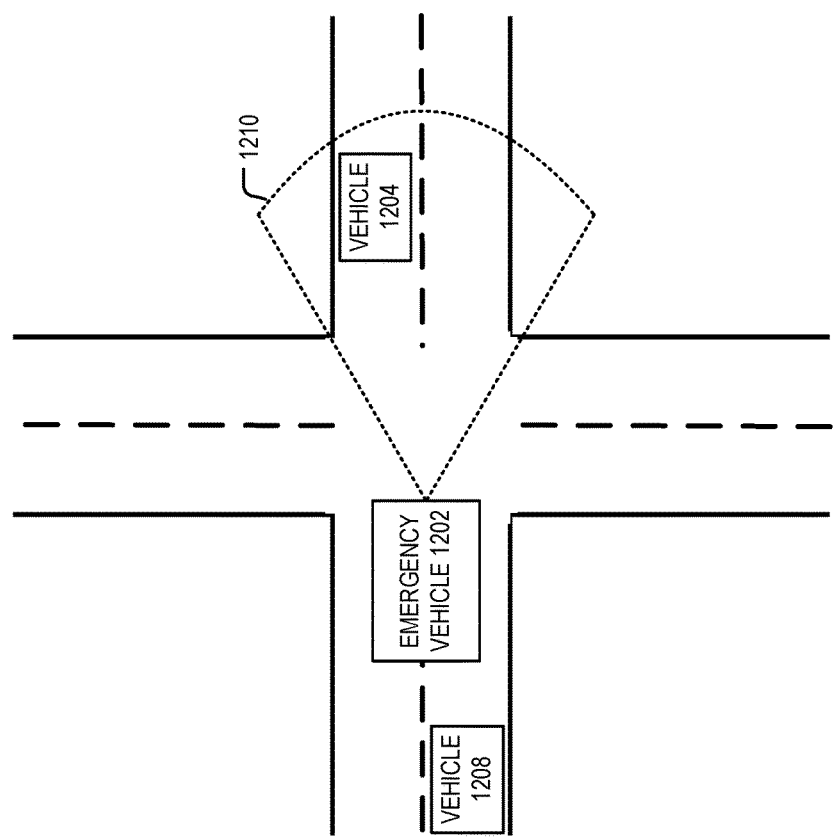

As described above, a digital radio broadcast transmission system of a mobile emergency vehicle may transmit a digital radio broadcast signal that can be decoded only by vehicles located within a localized area in a proximity of the emergency vehicle. In the example of FIG. 11, the localized area is a circular area that is centered at the transmission system. In the example of FIG. 12, an emergency vehicle 1202 utilizes a directional antenna to transmit greater power in a specific direction. Thus, as shown in the figure, the emergency vehicle 1202 transmits a digital radio broadcast signal that can be received and/or decoded only by vehicles located within a predetermined localized area 1210 that extends in front of the vehicle 1202 (e.g., in a direction that the vehicle 1202 is traveling). In this manner, a vehicle 1204 in front of the emergency vehicle 1202 is warned of an oncoming approach of the vehicle 1202, but a vehicle 1208 behind the emergency vehicle 1202 is not.

In examples, an end-user digital radio broadcast receiver system is configured to process received digital radio broadcast signals to determine whether a source of the signals is approaching the receiver system or moving away from the receiver system. Based on this determination, the receiver system may make a determination as to whether an emergency alert message included in the signals should be rendered. For example, if the digital radio broadcast receiver system determines that digital radio broadcast signals are being received from an emergency vehicle that is moving away from the receiver system, the receiver system may determine that emergency messages included in the signals are not relevant (e.g., the emergency vehicle is not approaching the receiver system), such that the messages should not be rendered.

The digital radio broadcast receiver system may detect a Doppler shift in the received signals to determine whether the source of the signals is approaching the receiver system or moving away from the receiver system. The digital radio broadcast receiver system may thus include a Doppler shift module configured to make such determinations. The Doppler shift module may be implemented via the baseband processor or host microcontroller portions of the digital radio broadcast receiver system, in examples. In an example, the host microcontroller is configured to process data that is generated by a tuner or IBOC decoder of the digital radio broadcast receiver system. The host microcontroller may specifically process this data to determine information on frequency misalignment or skew in received digital radio broadcast signals. The information on frequency misalignment or skew may be interpreted by the host microcontroller as a Doppler shift, thus enabling the digital radio broadcast receiver system to determine whether the source of the signals is approaching the receiver system or moving away from the receiver system.

The systems and methods described herein may be used for applications that are different from those described above. In examples, a digital radio broadcast transmission system may be placed in a fixed location and may broadcast warning messages to approaching vehicles. For example, a digital radio broadcast transmission system may be located at a railroad crossing and may be used to broadcast warning messages to vehicles within a predetermined proximity of the railroad crossing. These warning messages may indicate that a train is approaching the railroad crossing. Similarly, a digital radio broadcast transmission system may be located near a construction area on an interstate highway. The digital radio broadcast transmission system may broadcast messages warning drivers to slow down as they approach the construction area. Additionally, in examples, a digital radio broadcast receiver system may be placed in a fixed location and may receive warning messages from a digital radio broadcast transmission system (e.g., a digital radio broadcast transmission system of a mobile emergency vehicle). For example, digital radio broadcast receiver systems may be integrated with traffic light controls and electronic road signs so that an emergency alert message received at the receiver may be processed at the receiver so as to communicate an output control signal from an output of the receiver to control electronics of the traffic light or electronic road sign. When the digital radio broadcast receiver system is integrated with the traffic light controls, a traffic light pattern of a traffic light may be modified based on the receiver system's detection of a broadcasted warning message. Likewise, when the digital radio broadcast receiver system is integrated with the electronic road sign, a display (e.g., text, images, etc.) of the electronic road sign may be modified based on the receiver system's detection of a broadcasted warning message. For example, the receiver may trigger a predetermined traffic response at the traffic light (e.g., red lights for all directions at an intersection), trigger display of a stored message at an electronic road sign, or convey an emergency alert message from the receiver to be displayed on the electronic road sign. It is noted that these are examples only and that the systems and methods described herein may be used for various other applications.

In examples, the transmitted digital radio broadcast signals include priority codes that can be processed and interpreted by the receiver system. For example, priority codes may be used to provide data on one or more of the following: certainty of emergency (e.g., likely, unlikely, etc.), severity of emergency (e.g., high, moderate, low), urgency of emergency (e.g., immediate, non-immediate, etc.), message category (e.g., safety, etc.), scope (e.g., public, private, etc.), type (e.g., alert, etc.), and status (e.g., actual, anticipated, etc.), among others. In addition, in examples, the audio or visual data rendered at the receiver system may comprise multiple messages for different situations. Different situations include, for example, an oncoming emergency vehicle and a police officer seeking to pull over a speeding motorist, among others.

The systems and methods described herein differ from conventional approaches to providing emergency messages to drivers. In embodiments described herein, an unused frequency within the FM or AM broadcast band is utilized for transmitting emergency messages. The use of the unused frequency within the FM or AM broadcast band minimizes interference with commercial radio broadcasts at other frequencies. Conventional approaches, by contrast, may utilize other spectrums (i.e., spectrums outside of the FM and AM broadcast bands) for transmitting emergency messages. In addition, the systems and methods described herein utilize digital radio broadcasting techniques to send and receive emergency messages, in contrast to conventional systems that utilize analog radio broadcasting. The use of the digital radio broadcasting techniques, as described herein, provides enhanced functionality not possible in the conventional analog approaches. For example, the digital radio broadcast signals utilized herein include multiple data channels (e.g., SIS, MPS, and SPS data channels, etc.) for communicating different kinds of information. A first data channel may include an alert notification code that informs the receiver system that the digital radio broadcast signal comprises an emergency message. A second data channel may include an emergency alert message in a first language, and a third data channel may include an emergency alert message in a second language. Conventional emergency alert notification systems do not utilize the multiple data channels described herein and hence do not provide numerous of the functionalities described herein. For example, the conventional approaches do not include (i) detecting if an emergency alert notification code is included within a broadcast signal, and (ii) then rendering a warning message based on a detection of the emergency alert notification code. The conventional approaches also cannot, for example, provide multilingual emergency messages via the different data channels, as described herein. Other differences between the conventional approaches and the subject matter of the instant application are described throughout this disclosure.

Figure 13:
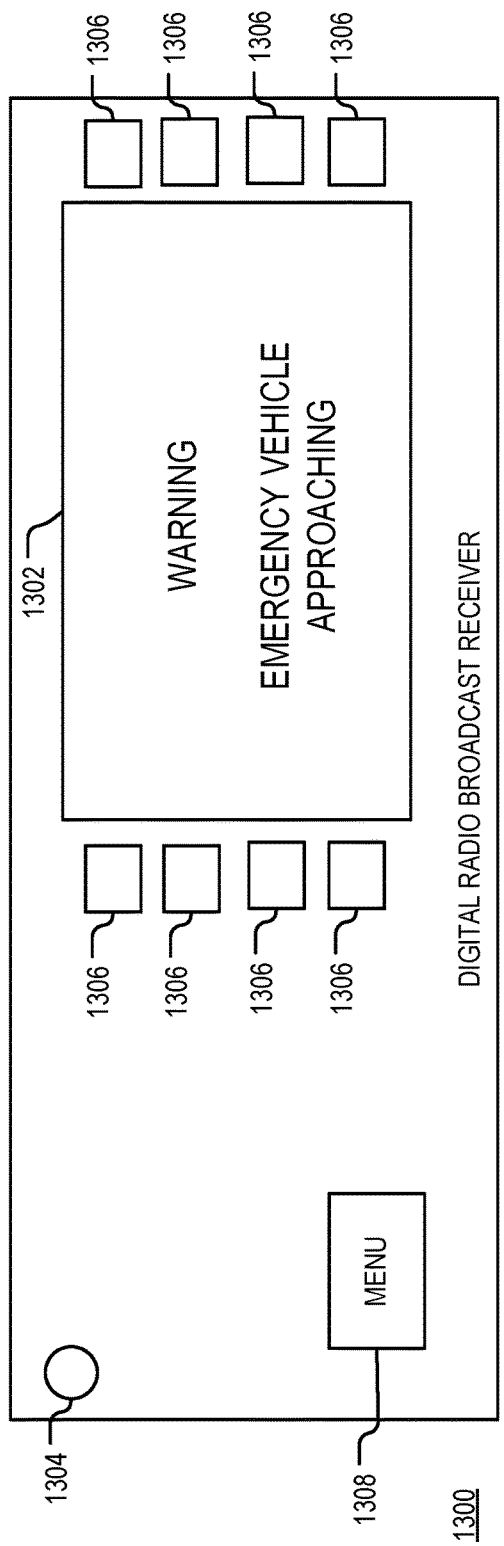
FIG. 13 depicts an example digital radio broadcast receiver.

As described above, an end-user digital radio broadcast receiver system may be configured to render data included within a digital radio broadcast signal based on a detection of an emergency alert notification code within the signal. In an example, the rendered data includes a textual warning message that is displayed on a display of the receiver system or another display of a vehicle. FIG. 13 depicts a front panel of a digital radio broadcast receiver 1300 that may be used to display a textual warning message. The front panel includes a display 1302, power button 1304, soft keys 1306 and menu button 1308. The display 1302 may be a conventional LCD display or any other type of display known to a person of ordinary skill in the art. In normal operation, the display 1302 may be configured to show station call letters, song name, artist name, current time, etc. When an emergency alert message comprising a textual warning message is rendered at the digital radio broadcast receiver system, the display 1302 may display a warning (e.g., "Warning— Emergency Vehicle Approaching"), as shown in the figure.

The digital radio broadcast signals used in conveying the emergency alert warning messages described herein may be formatted in accordance with the digital radio IBOC broadcast standard. The IBOC system consists of main program services (MPS) including audio and program service data (PSD) text, secondary program services (SPS) including audio and PSD text, Station Information Service (SIS) messaging for service announcements, and advanced application services (AAS) for large data transfer and specialized applications. The SIS messaging service contains a transport and message protocol for active radio (AR) messaging.

In examples, an emergency alert notification code may be formatted according to the AR messaging protocol of the SIS messaging service. The IBOC emergency alerts protocol includes an AR message as defined in NRSC-5C SY_IDD_1020s documentation, which is available at http://www.nrscstandards.org/SG/NRSC-5-C/1020sI.pdf, and incorporated herein by reference in its entirety. This message type allows a digital radio broadcast transmission system to send alert messages. The alert messages are primarily intended for alerting the public in emergency situations and may address any cause defined by the Common Alerting Protocol (CAP). The message allows for waking-up receivers. The AR Message has a total payload of 58 bits per frame. It can span from a minimum of 2 frames to a maximum of 64 frames.

Figure 14A:
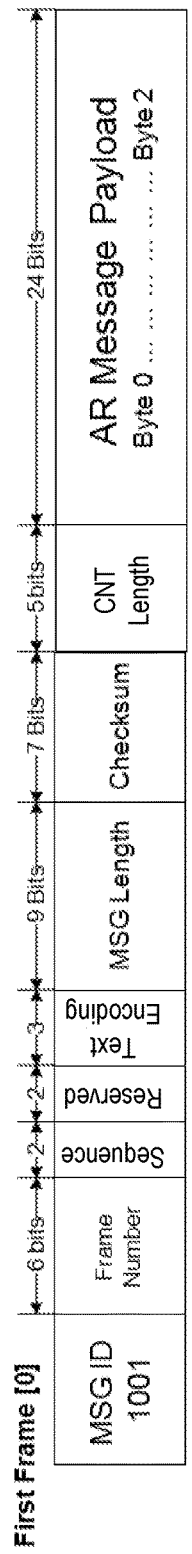
FIGS. 14A and 14B depict the IBOC Active Radio (AR) message structure for two frames.
Figure 14B:
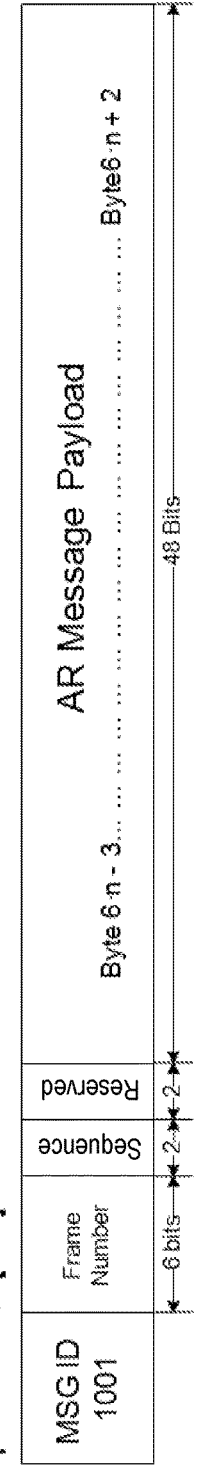

FIGS. 14A and 14B depict the IBOC Active Radio (AR) message structure for two frames. Specifically, FIG. 14A depicts a structure of a first frame of a message, and FIG. 14B depicts a structure of subsequent frames of a message. As shown in FIG. 14A, the first frame includes 6 bits for representing a frame number, 2 bits indicating a sequence number, 2 reserved bits, 3 text encoding bits, 9 bits representing a message length, a 7-bit checksum, 5 bits representing a CNT length, and 24 bits for an AR message payload. The length information and the checksum may be included in the first frame to increase receiver reliability. As shown in FIG. 14B, the subsequent frames of the message include 6 bits for representing the frame number, 2 bits indicating the sequence number, 2 reserved bits, and 48 bits for an AR message payload. The sequence number indicates when the message content has changed. Specifically, any change in the message content is considered a new message and the sequence number is incremented. In the systems and methods described herein, the first data comprising the alert notification code may be included in the AR message payload.

A message may span up to 64 frames. Thus, in the example of FIGS. 14A and 14B, after the first frame having the structure shown in FIG. 14A, there may be up to 63 additional frames having the structure shown in FIG. 14B. The AR Message can be used to send a string of up to 381 bytes per message which may include various bit-oriented data elements as well as 8-bit characters or 16-bit characters. In examples, a text string warning message may be added to the AR message payload. Further, in some embodiments, a message type for emergency vehicle warning is uniquely defined to not generate warning notifications for home/stationary receivers.

FM IBOC transmission of emergency alert messages may utilize a number of different FM service modes, including the MP1, MP3, MPS, and MP6 service modes known to those of ordinary skill in the art. In examples, the MP6 service mode is used for the transmission of the emergency alert messages. This service mode is an all-digital FM broadcast which provides a relatively high level of robust transmission. Further, the MP6 service mode does not require an analog carrier component, which may limit interference to existing analog receivers.

In the IBOC transmissions, MPS audio content may include a pre-recorded audio message in a primary language for a location of product use. Thus, for example, in the United States, the MPS audio content may include a pre-recorded audio message in English, but in Mexico, the MPS audio content may include a pre-recorded audio message in Spanish. The pre-recorded audio message may include a clear audible notification of the warning announcement. MPS PSD content may be used to send text notifications in the primary language for display on a display screen of the digital radio broadcast receiver. SPS audio content may include a pre-recorded audio message in a secondary language for the location of product use. This message may include a clear audible notification of the warning announcement in the secondary language. SPS PSD content may be used to send text notifications in the secondary language for display on a display screen of the digital radio broadcast receiver.

FIG. 15 is a block diagram depicting example components of a digital radio broadcast transmission system configured to broadcast emergency alert messages in accordance with certain embodiments. The digital radio broadcast transmission system may comprise a low-power transmitter (e.g., a transmitter broadcasting at a power of less than 1 watt) and may be installed in a mobile emergency vehicle. The warning message may be a pre-recorded IBOC waveform including an emergency alert active radio (AR) protocol announcement in the SIS data channel. The emergency alert active radio protocol announcement may be an example of the "emergency alert notification code" described herein. The pre-recorded IBOC waveform may further include a primary language audio warning message on the MPS channel, a primary language text notification in the MPS PSD fields, a secondary language audio warning message on the SPS1 channel, and a secondary language text notification in the SPS PSD fields. A digital radio broadcast receiver may be configured to render one or more of the primary language audio warning message, the primary language text notification, the secondary language audio warning message, and the secondary language text notification based on a detection of the emergency alert active radio protocol announcement in the received digital radio broadcast signal.

The pre-recorded IBOC waveform may be generated at baseband. The in-phase (I component) and quadrature-phase (Q component) may be digitized at a predetermined sample rate (e.g., the fundamental IBOC sample rate of 744187.5 Hz). The digitized IBOC waveform may be stored in a memory 1502 of the digital radio broadcast transmission system. Upon activation either manually by the operator or automatically by activation of the vehicle siren, the transmitter may read the digitized IBOC waveform (I & Q samples) from the memory 1502. The memory 1502 may be sized to allow for storage of multiple warning waveforms with different warning messages. A digital up-converter (DUC) 1504 may up-convert the digitized waveform to a useable baseband frequency, and a digital-to-analog converter (DAC) 1506 may convert the digitized waveform to an analog waveform.

Inductor-capacitor (LC) bandpass filters 1508, 1510 may be used to remove any image components from the analog baseband waveform output by the DAC 1506. Using a mixer 1512, the analog baseband waveform is mixed to an appropriate RF frequency in the FM band (e.g., 87.9 MHz). This RF frequency is the frequency at which the digital radio broadcast transmission system transmits emergency alert messages and is known to digital radio broadcast receiver systems as being an emergency notification frequency. An LC bandpass filter 1514 centered at the RF frequency may be used to remove any RF mixing products to reduce potential interference. In examples, the LC bandpass filter 1514 has a bandwidth of +/−300 kHz. The RF power of the digital radio broadcast transmission system may be limited to less than 1 watt, in embodiments.

A crystal oscillator (XO) 1516 may be used to properly mix the baseband signal to RF and may also be used to manage clocking of a control processor 1520 and memory circuitry. In examples, the control processor 1520 manages the memory interface and initiates the reading of the I/Q baseband samples from the memory 1502. The control processor 1520 may also manage the configuration and operation of the DUC 1504 and DAC 1506. As shown in FIG. 15, the control processor 1520 controls the DUC 1504 and DAC 1506 via a Serial Peripheral Interface (SPI) bus. A series of DIP switches 1524, 1526 may be used to provide additional operational control configuration to the control processor 1520. A control interface 1522 may be used for adjusting operation, selecting the broadcast waveform from the memory 1502, or upgrading the waveform saved in the memory 1502.

Figure 16:
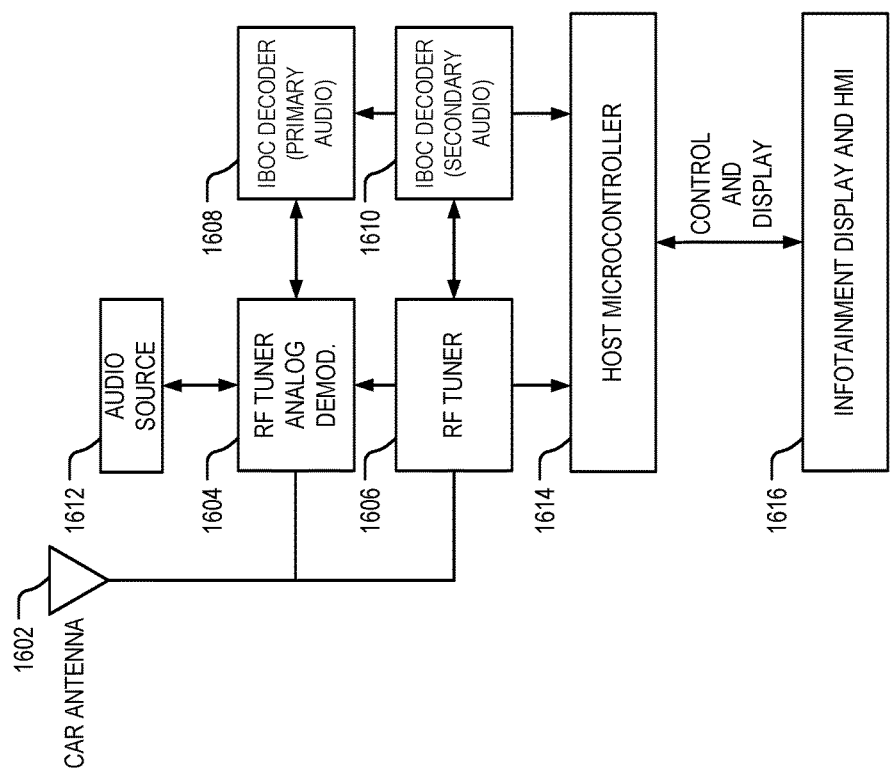
FIG. 16 is a block diagram depicting example components of a digital radio broadcast receiver system configured to receive emergency alert messages in accordance with certain embodiments.

FIG. 16 is a block diagram depicting example components of a digital radio broadcast receiver system configured to receive emergency alert messages in accordance with certain embodiments. In examples, the digital radio broadcast receiver system is an IBOC-capable car infotainment system with radio receiver. The digital radio broadcast receiver system is configured to (i) receive a digital radio broadcast signal broadcasted at an emergency notification frequency, (ii) detect first data comprising an emergency alert notification code within the digital radio broadcast signal, and (iii) based on the detection of the first data, render second data included within the digital radio broadcast signal, where the second data includes an emergency alert message (e.g., an audio message and/or a visual notification).

As shown in FIG. 16, the digital radio broadcast receiver system includes an antenna 1602 for receiving radio signals (e.g., analog radio signals, digital radio broadcast signals, etc.). The receiver system includes RF tuners 1604, 1606 for tuning to different frequencies. The components 1604, 1606 may further be configured to demodulate signals received from the antenna 1602 and transmit demodulated outputs to decoders 1608, 1610, respectively, via IBOC signaling protocols. The decoders 1608, 1610 decode received signals to generate data (e.g., audio, video, text, still images, multimedia, etc.) that can be rendered at the digital radio broadcast receiver system. In the example of FIG. 16, the receiver system is configured to tune to multiple different frequencies simultaneously and receive signals at the different frequencies simultaneously. Thus, for example, the tuner 1604 may be used to tune to a frequency selected by a human user, and the tuner 1606 may be used to tune to the emergency notification frequency at which emergency alert messages are broadcasted.

The tuner 1606 may be configured to tune to the emergency notification frequency automatically and without prompting by the human user. A host microcontroller 1614 may be configured to control the tuner 1606 to perform the automatic tuning. In examples, the host microcontroller 1614 includes a processing system (e.g., a data processor including one or more processor cores, etc.), memory, and input/output peripherals for communicating with coupled components of the receiver system. The host microcontroller comprises an FPGA in some embodiments. The memory of the host microcontroller 1614 may be encoded with instructions for commanding the processing system to carry out steps, such as those described herein with reference to FIGS. 16 and 17. In examples, the tuner 1606 tunes to the emergency notification frequency periodically or continuously based on the control of the host microcontroller 1614. The tuner 1606 may be configured to tune to the emergency notification frequency and receive an emergency warning message at the emergency notification frequency while a radio signal at a different frequency is being received by the receiver system. The tuning to the emergency notification frequency may be performed in the background and may be imperceptible to the human user.

After receipt of the digital radio broadcast signals including the emergency warning messages, the receiver system may be configured to interrupt a rendering of other data to render the emergency warning messages. The host microcontroller 1614 may be configured to detect whether a digital radio broadcast signal includes an emergency warning message, and if so, to cause the emergency warning message to be rendered at the receiver system. The rendering of the emergency warning messages may utilize an infotainment display and human machine interface (HMI) 1616. For example, textual messages may be rendered on the display 1616.

The digital radio broadcast receiver system may receive an input signal from an audio source 1612. The audio source 1612 may be, for example, a CD player, DVD player, MP3 player, Bluetooth source, auxiliary (line) input, etc. The tuner 1606 may be configured to automatically tune to the emergency notification frequency and receive an emergency warning message at the emergency notification frequency while the digital radio broadcast receiver system renders data from the audio source 1612. The tuning to the emergency notification frequency may be performed in the background and may be imperceptible to the human user. This automatic tuning may be performed at the control of the host microcontroller 1614. After receipt of the digital radio broadcast signal including the emergency warning messages, the receiver system may be configured to interrupt a rendering of data from the audio source 1612 to render the emergency warning messages. The host microcontroller 1614 may be configured to detect whether a digital radio broadcast signal includes an emergency warning message and to interrupt a rendering of other data from the audio source 1612 to render the emergency warning message.

Figure 17:
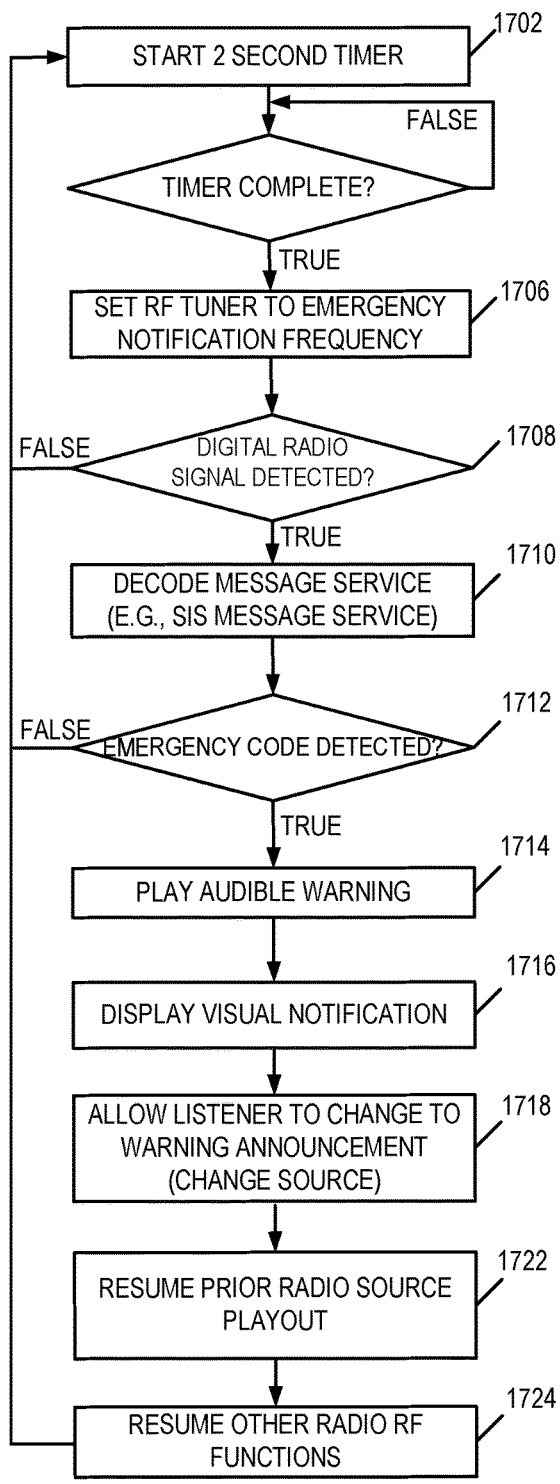
FIG. 17 is an example flowchart showing steps performed by a digital radio broadcast receiver system.

FIG. 17 is an example flowchart showing steps performed by an end-user digital radio broadcast receiver system. In examples, the steps of the flowchart are performed under the control of the host microcontroller 1614 of the digital radio broadcast receiver system. As noted above, the host microcontroller 1614 may include a processing system and memory. In examples, the memory of the host microcontroller 1614 is encoded with instructions for commanding the processing system to carry out or facilitate the steps of the flowchart of FIG. 17. Thus, the host microcontroller 1614 manages the message detection and process control for emergency alert notification as depicted in the flowchart of FIG. 17.

The process shown in FIG. 17 is performed constantly and regardless of which source is being used in the receiver system. For example, if the receiver system is currently processing Bluetooth audio from a paired device, the radio tuner will continue the process of FIG. 17 in the background. If an emergency alert message is received as a result of steps of the flowchart, the emergency alert message may be rendered at the receiver system, thus interrupting the rendering of the Bluetooth audio. Similarly, if the system is currently processing a radio signal at a frequency selected by a human user, the system may continue to perform the steps of the flowchart in the background. If an emergency alert message is received as a result of steps of the flowchart, the emergency alert message may be rendered at the receiver system, thus interrupting the rendering of the radio signal at the user-selected frequency.

At 1706, the RF tuner of the digital radio broadcast receiver system is set to the emergency notification frequency. As described above, this is a predetermined frequency used by a digital radio broadcast transmission system to transmit emergency warning messages. In examples, the predetermined frequency is an unused frequency within the FM broadcast band or a frequency within the public service band. At 1708, a determination is made as to whether a digital radio broadcast signal (e.g., an IBOC signal) is detected at the emergency notification frequency. If a digital radio broadcast signal is not detected at the emergency notification frequency, then the process proceeds to 1702. At 1702, a 2-second timer is started. In other examples, a timer of a different amount of time is started (e.g., 1 second, 3 seconds, etc.). After the timer is complete, the process starts again at 1706.

In the example of FIG. 17, the digital radio broadcast receiver system is configured to tune to the emergency notification frequency periodically (e.g., every 2 seconds). In other examples, the digital radio broadcast receiver system is configured to tune to the emergency frequency continuously, such that no delay time is used before restarting the process at 1706. The steps at 1702, 1706, and 1708 may be carried out or facilitated by the host microcontroller 1614 of the receiver system, as noted above. Thus, the host microcontroller 1614 may control the RF tuner to tune to the emergency notification frequency, manage the timer, and communicate with the RF tuner to determine if the digital radio broadcast signal is detected.

If a digital radio broadcast signal is detected at 1708, the digital radio broadcast signal is received by the receiver system. At 1710 and 1712, the digital radio broadcast receiver system detects whether first data comprising an alert notification code is included in the digital radio broadcast signal. As described above, the emergency alert notification code may be included in the SIS data channel of an IBOC signal. Thus, to perform the steps 1710 and 1712, a decoder (e.g., the decoder 1610 of FIG. 16) may decode the IBOC SIS message, and a determination may then be made as to whether the SIS data channel includes an alert notification code. The step 1712 may be performed by the host microcontroller 1614 of FIG. 16. For example, the host microcontroller 1614 may receive data from the decoder and may process the data to determine whether it includes an alert notification code.

If it is determined at 1712 that an emergency notification code is not included in the digital radio broadcast signal, then the process returns to 1702. If it is determined that an emergency notification code is included in the digital radio broadcast signal, then at 1714, an audible notification (e.g., warning) is generated. At 1716, a visual notification is displayed (e.g., on the infotainment display 1616). The rendering of the audible and visual notifications may interrupt a rendering of other data (e.g., audio or visual display data) at the receiver system. The rendering of the audible and visual notifications may include rendering data included within the received digital radio broadcast signal (e.g., data included in the MPS and SPS channels of the signal), as described above.

At 1718, the user may be prompted to change source content to the emergency notification frequency. If the user chooses to do this, the receiver system may continue to receive digital radio broadcast signals at the emergency notification frequency. After an appropriate amount of time, at 1722, the receiver system may resume prior radio source playout, and at 1724, the receiver system may resume other radio RF functions. After the step 1724 is performed, the process may return to the step 1702.

Figure 18B:
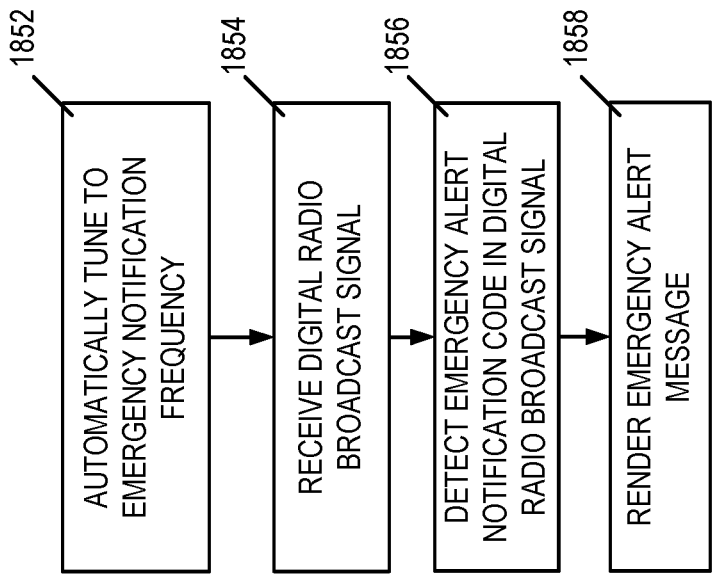
FIG. 18B is a flowchart depicting steps of an example method for receiving an emergency alert message at a digital radio broadcast receiver system from a digital radio broadcast transmission system.
Figure 18A:
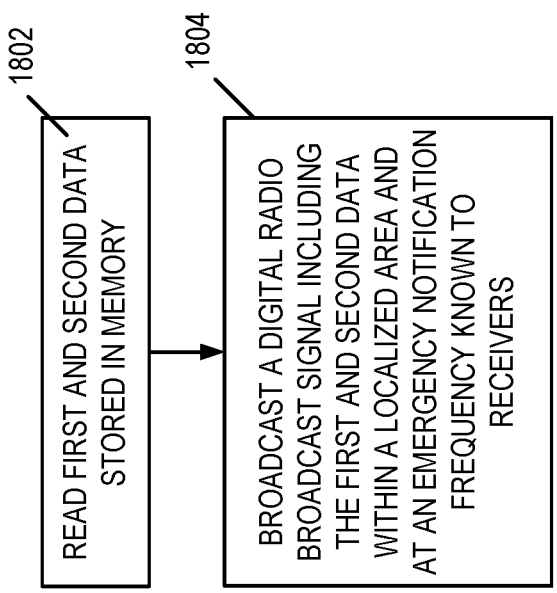
FIG. 18A is a flowchart depicting steps of an example method for communicating an emergency alert message from a digital radio broadcast transmission system to a digital radio broadcast receiver system.

FIG. 18A is a flowchart depicting steps of an example method for communicating an emergency alert message from a digital radio broadcast transmission system of a mobile vehicle to a digital radio broadcast receiver system. At 1802, data stored in a memory of a digital radio broadcast transmission system is read. The data includes first data comprising an emergency alert notification code and second data configured to be rendered by a digital radio broadcast receiver. The second data includes an emergency alert message. At 1804, a digital radio broadcast signal including the first and second data is broadcasted using the digital radio broadcast transmission system from a mobile vehicle to end-user digital radio broadcast receivers at a predetermined frequency within an FM commercial broadcast band or an AM commercial broadcast band that is recognized by the digital radio broadcast receivers as an emergency notification frequency. The digital radio broadcast signal has characteristics that enable the signal to be decoded only by digital radio broadcast receivers located within a localized area in a proximity of the transmission system.

FIG. 18B is a flowchart depicting steps of an example method for receiving an emergency alert message at a digital radio broadcast receiver system from a digital radio broadcast transmission system of a mobile vehicle. At 1852, the digital radio broadcast receiver system is controlled to automatically tune to an emergency notification frequency within an FM commercial broadcast band or an AM commercial broadcast band. The emergency notification frequency is a frequency at which a digital radio broadcast transmission system of a mobile vehicle broadcasts emergency alert messages. At 1854, a digital radio broadcast signal broadcasted at the emergency notification frequency by the digital radio broadcast transmission system is received. The digital radio broadcast signal has characteristics that enable the signal to be decoded only by digital radio broadcast receivers located within a localized area in a proximity of the transmission system. At 1856, first data comprising an emergency alert notification code is detected within the digital radio broadcast signal. At 1858, based on the detection of the first data, second data included within the digital radio broadcast signal is rendered at the digital radio broadcast receiver system. The second data includes an emergency alert message.

The exemplary approaches described may be carried out using any suitable combinations of software, firmware and hardware and are not limited to any particular combinations of such. Computer program instructions for implementing the exemplary approaches described herein may be embodied on a computer-readable storage medium, such as a magnetic disk or other magnetic memory, an optical disk (e.g., DVD) or other optical memory, RAM, ROM, or any other suitable memory such as Flash memory, memory cards, etc. Additionally, the disclosure has been described with reference to particular embodiments. However, it will be readily apparent to those skilled in the art that it is possible to embody the disclosure in specific forms other than those of the embodiments described above. The embodiments are merely illustrative and should not be considered restrictive. The scope of the disclosure is given by the appended claims, rather than the preceding description, and all variations and equivalents which fall within the range of the claims are intended to be embraced therein.

What is claimed is:

1. A method for receiving an emergency alert message at a digital radio broadcast receiver system from a digital radio broadcast transmission system of a mobile vehicle; the method comprising;

controlling the digital radio broadcast receiver system to automatically tune to an emergency notification frequency within an FM commercial broadcast band or an AM commercial broadcast band while the digital radio broadcast receiver system is also tuned to a radio broadcast of a second frequency different from the emergency notification frequency, the emergency notification frequency being a frequency at which a digital radio broadcast transmission system of a mobile vehicle broadcasts emergency alert messages;

receiving, at the digital radio broadcast receiver system, a digital radio broadcast signal broadcasted at the emergency notification frequency by the digital radio broadcast transmission system, the digital radio broadcast signal including the emergency notification frequency and multiple data channels mapped to subcarriers of the emergency notification frequency, and the digital radio broadcast signal having characteristics that enable the digital radio broadcast signal to be decoded only by digital radio broadcast receivers located within a localized area in a proximity of the transmission system;

determining whether a source of the digital radio broadcast signal broadcasted at the emergency notification frequency is approaching the digital radio broadcast receiver system;

detecting first data comprising an emergency alert notification code within one data channel of the multiple data channels of the digital radio broadcast signal; and based on the detection of the first data and the determination that the source of the digital radio broadcast signal broadcasted at the emergency notification frequency is approaching the digital radio broadcast receiver system, rendering second data included within an additional data channel of the multiple data channels of the digital radio broadcast signal at the digital radio broadcast receiver system, the second data comprising an emergency alert message.

2. The method of claim 1, wherein the digital radio broadcast receiver system is configured to periodically or continuously tune to the emergency notification frequency.

3. The method of claim 1, wherein the digital radio broadcast receiver system is configured to tune to the emergency notification frequency and receive the digital radio broadcast signal automatically and without prompting by a human.

4. The method of claim 1, wherein the digital radio broadcast receiver system is configured to tune to the emergency notification frequency and receive the digital radio broadcast signal while receiving a second digital radio broadcast signal at a second frequency selected by a human, the tuning to the emergency notification frequency and the receiving of the digital radio broadcast signal being imperceptible to the human.

5. The method of claim 1, wherein the digital radio broadcast receiver is configured to tune to the emergency notification frequency and receive the digital radio broadcast signal while rendering other data based on input from a human, the tuning to the emergency notification frequency and the receiving of the digital radio broadcast signal being imperceptible to the human.

6. The method of claim 5, wherein the rendering of the second data interrupts a rendering of the other data.

7. The method of claim 1, wherein the digital radio broadcast receiver is configured to interrupt a rendering of other data to render the second data.

8. The method of claim 1, wherein the second data comprises one or more of video, text, still images, multimedia, and audio.

9. The method of claim 1, wherein the emergency alert message comprises a notification of an approach of an emergency vehicle.

10. The method of claim 1, wherein the FM commercial broadcast band comprises a frequency range of 87.9 MHz to 107.9 MHz.

11. The method of claim 1, wherein the FM commercial broadcast band comprises a frequency range of 87.5 MHz to 108.0 MHz.

12. The method of claim 1, wherein the emergency notification frequency is an unused frequency within the FM commercial broadcast band.

13. The method of claim 1, wherein the localized area comprises an area having a predetermined radius surrounding the transmission system.

14. The method of claim 13, wherein the predetermined radius is 1000 feet.

15. The method of claim 1, further comprising:
tuning to the emergency notification frequency and detecting a presence of the digital radio broadcast signal at the emergency notification frequency;
based on a determination that the digital radio broadcast signal is not present at the emergency notification frequency, tuning to the emergency notification frequency again after a predetermined period of time;
based on a determination that the digital radio broadcast signal is present at the emergency notification frequency, receiving the digital radio broadcast signal and detecting whether the first data is included in the digital radio broadcast signal;
based on a determination that the first data is not included in the digital radio broadcast signal, tuning to the emergency notification frequency again after the predetermined period of time; and
based on a determination that the first data is included in the digital radio broadcast signal, rendering the second data.

16. The method of claim 15, further comprising:
based on the determination that the first data is included in the digital radio broadcast signal, prompting a user to tune the digital radio broadcast receiver system to the emergency notification frequency to continue receiving data relating to the emergency alert message.

17. A digital broadcast receiver system configured to receive an emergency alert message from a digital radio broadcast transmission system, the digital radio broadcast receiver system comprising:
a processing system; and
a memory coupled to the processing system wherein the processing system is configured to:
control the digital radio broadcast receiver system to automatically tune to an emergency notification frequency within an FM commercial broadcast band or an AM commercial broadcast band while the digital radio broadcast receiver system is also tuned to a radio broadcast of a second frequency different from the emergency notification frequency, the emergency notification frequency being a frequency at which a digital radio broadcast transmission system of a mobile vehicle broadcasts emergency alert messages;
receive a digital radio broadcast signal broadcasted at the emergency notification frequency by the digital radio broadcast transmission system, the digital radio broadcast signal including the emergency notification frequency and multiple data channels mapped to subcarriers of the emergency notification frequency, and the digital radio broadcast signal having characteristics that enable the digital radio broadcast signal to be decoded only by end-user digital radio broadcast receivers located within a localized area in a proximity of the transmission system;
determine whether a source of the digital radio broadcast signal broadcasted at the emergency notification frequency is approaching the digital radio broadcast receiver system;
detect first data comprising an emergency alert notification code within one data channel of the multiple data channels of the digital radio broadcast signal; and
based on the detection of the first data and the determination that the source of the digital radio broadcast signal broadcasted at the emergency notification frequency is approaching the digital radio broadcast receiver system, render second data included within an additional data channel of the multiple data channels of the digital radio broadcast signal at the digital radio broadcast receiver system, the second data comprising an emergency alert message.

18. An article of manufacture comprising a non-transitory computer readable storage medium having computer program instructions for receiving an emergency alert message at a digital radio broadcast receiver system from a digital radio broadcast transmission system of a mobile vehicle, said instructions when executed adapted to cause a processing system to:
control the digital radio broadcast receiver system to automatically tune to an emergency notification frequency within an FM commercial broadcast band or an AM commercial broadcast band while the digital radio broadcast receiver system is also tuned to a radio broadcast of a second frequency different from the emergency notification frequency, the emergency notification frequency being a frequency at which a digital radio broadcast transmission system of a mobile vehicle broadcasts emergency alert messages;
receive a digital radio broadcast signal broadcasted at the emergency notification frequency by the digital radio broadcast transmission system, the digital radio broadcast signal including the emergency notification frequency and multiple data channels mapped to subcarriers of the emergency notification frequency, and the digital radio broadcast signal having characteristics that enable the digital radio broadcast signal to be decoded only by end-user digital radio broadcast receivers located within a localized area in a proximity of the transmission system;
determining whether a source of the digital radio broadcast signal broadcasted at the emergency notification frequency is approaching the digital radio broadcast receiver system:
detect first data comprising an emergency alert notification code within one data channel of the multiple data channels of the digital radio broadcast signal; and
based on the detection of the first data and the determination that the source of the digital radio broadcast signal broadcasted at the emergency notification frequency is approaching the digital radio broadcast receiver system, render second data included within an additional data channel of the multiple data channels of the digital radio broadcast signal at the digital radio broad cast receiver system, the second data comprising an emergency alert message.

* * * * *